US011978162B2

(12) United States Patent
Brooks et al.

(10) Patent No.: US 11,978,162 B2
(45) Date of Patent: May 7, 2024

(54) SYSTEM AND METHOD FOR IMPROVED RENDERING OF COMPUTER GRAPHIC MODELS

(71) Applicant: TAKE-TWO INTERACTIVE SOFTWARE, INC., New York, NY (US)

(72) Inventors: John Brooks, New York, NY (US); Shawn Best, New York, NY (US); Alex Pepper, New York, NY (US); Mike Krazanowski, New York, NY (US); Douglas E. Snyder, New York, NY (US)

(73) Assignee: Take-Two Interactive Software, Inc., New York, NY (US)

(*) Notice: Subject to any disclaimer, the term of this patent is extended or adjusted under 35 U.S.C. 154(b) by 321 days.

(21) Appl. No.: 17/555,280

(22) Filed: Dec. 17, 2021

(65) Prior Publication Data
US 2022/0198752 A1   Jun. 23, 2022

Related U.S. Application Data

(60) Provisional application No. 63/127,913, filed on Dec. 18, 2020.

(51) Int. Cl.
G06T 17/20 (2006.01)
G06T 1/60 (2006.01)
G06T 9/00 (2006.01)

(52) U.S. Cl.
CPC .............. *G06T 17/205* (2013.01); *G06T 1/60* (2013.01); *G06T 9/00* (2013.01); *G06T 2210/36* (2013.01); *G06T 2210/56* (2013.01)

(58) Field of Classification Search
CPC ........... G06T 17/205; G06T 1/60; G06T 9/00; G06T 2210/36; G06T 2210/56
See application file for complete search history.

(56) References Cited

U.S. PATENT DOCUMENTS

| | | |
|---|---|---|
| 6,169,549 B1 | 1/2001 | Burr |
| 6,307,554 B1 | 10/2001 | Arai et al. |
| 6,421,051 B1 | 7/2002 | Kato |
| 6,611,267 B2 | 8/2003 | Migdal et al. |
| 6,933,940 B2 | 8/2005 | Junkins et al. |
| 7,081,893 B2 | 7/2006 | Cerny |
| 7,283,134 B2 | 10/2007 | Hoppe |
| 7,372,468 B1 * | 5/2008 | Toksvig .................. G06T 15/04 345/611 |
| 7,538,769 B2 | 5/2009 | Hoppe |
| 8,432,394 B1 * | 4/2013 | Hutchins ............... G06T 15/405 345/422 |
| 8,493,381 B1 | 7/2013 | Touma et al. |
| 2004/0249617 A1 | 12/2004 | Lau et al. |
| 2008/0117221 A1 * | 5/2008 | Hutchins ................. G06T 15/40 345/506 |

(Continued)

*Primary Examiner* — Phuc N Doan
(74) *Attorney, Agent, or Firm* — Orrick, Herrington & Sutcliffe LLP

(57) ABSTRACT

Systems and methods applicable, for instance, to using continuous levels of detail (CLODs) in connection with computer graphic models. Distinct levels of detail (LODs) can be generated, floating point LOD (fLOD) values can be calculated, and interpolated LODs can be generated. Further, LOD display can occur.

30 Claims, 23 Drawing Sheets

(56) References Cited

U.S. PATENT DOCUMENTS

| | | | | |
|---|---|---|---|---|
| 2015/0324391 A1* | 11/2015 | Werner | ............... | G06F 16/5838 |
| | | | | 707/722 |
| 2015/0379688 A1* | 12/2015 | Cheng | ................... | G06T 15/005 |
| | | | | 345/589 |
| 2018/0232940 A1* | 8/2018 | Goossen | ................. | G06T 15/04 |
| 2020/0219285 A1* | 7/2020 | Faramarzi | ............... | G06T 5/002 |
| 2022/0096932 A1* | 3/2022 | Raymond | ............. | G06T 15/005 |
| 2022/0215612 A1* | 7/2022 | Fielding | ................... | G06T 7/44 |

\* cited by examiner

```
Example Model
Model Vertices
    Vertex     [X,Y,Z]
      0:   [    5,   0,  -1]
      1:   [    7,   0,   3]
      2:   [    3,   0,   4]
      3:   [ -127,   0,  10]
      4:   [   39,   0,  27]
      5:   [   36,   0,  29]
      6:   [   35,   0,  28]
      7:   [   34,   0,  30]
      8:   [  127,   0,  -5]

Model Triangles
    Triangle  Vertices
      0:   [ 0, 1, 2]
      1:   [ 4, 5, 6]
      2:   [ 6, 5, 7]
      3:   [ 2, 6, 3]
      4:   [ 1, 8, 4]

ModelScale = 254.0
BoundingSphereRadius = 127.4
```

Fig. 1B

```
Model Quantized Vertices
   Vertex    Binary[QX,QY,QZ]                              Decimal[QX,QY,QZ]     Model[X,Y,Z]
      0:   [10000101b,10000000b,01111111b],  [133,128,127],  [    5,   0,  -1]
      1:   [10000111b,10000000b,10000001b],  [135,128,131],  [    7,   0,   3]
      2:   [10000011b,10000000b,10000100b],  [131,128,132],  [    3,   0,   4]
      3:   [00000001b,10000000b,10001010b],  [  1,128,138],  [ -127,   0,  10]
      4:   [10100111b,10000000b,10011001b],  [167,128,153],  [   39,   0,  27]
      5:   [10100100b,10000000b,10011101b],  [164,128,157],  [   36,   0,  29]
      6:   [10100011b,10000000b,10011100b],  [163,128,156],  [   35,   0,  28]
      7:   [10100010b,10000000b,10011110b],  [162,128,158],  [   34,   0,  30]
      8:   [11111111b,10000000b,01111011b],  [255,128,123],  [  127,   0,  -5]
```

Fig. 1C

```
DistinctLOD 1

PrecisionMask = 11111111b << 1 = 11111110b

LOD Quantized Vertices
    Vertex    Binary[QX,QY,QZ]                            Decimal[QX,QY,QZ]      Model[X,Y,Z]
       0:  [10000100b,10000000b,01111110b],  [132,128,126],  [   4, 0, -2]
       1:  [10000110b,10000000b,10000010b],  [134,128,130],  [   6, 0,  2]
       2:  [10000010b,10000000b,10000100b],  [130,128,132],  [   2, 0,  4]
       3:  [00000000b,10000000b,10001010b],  [  0,128,138],  [-128, 0, 10]
       4:  [10100110b,10000000b,10011010b],  [166,128,154],  [  38, 0, 26]
       5:  [10100100b,10000000b,10011100b],  [164,128,156],  [  36, 0, 28]
       6:  [10100010b,10000000b,10011100b],  [162,128,156],  [  34, 0, 28]
       7:  [10100010b,10000000b,10011110b],  [162,128,158],  [  34, 0, 30]
       8:  [11111110b,10000000b,01111010b],  [254,128,122],  [ 126, 0, -6]

Model Triangles
    Triangle Vertices        Result
       0:   [ 0, 1, 2]   -> Ordered Triangle 2: [ 6, 3, 0]
       1:   [ 4, 5, 6]   -> Ordered Triangle 3: [ 5, 7, 1]
       2:   [ 6, 5, 7]   -> Ordered Triangle 4: [ 1, 7, 8]
       3:   [ 2, 6, 3]   -> Ordered Triangle 0: [ 0, 1, 2]
       4:   [ 1, 8, 4]   -> Ordered Triangle 1: [ 3, 4, 5]

LOD Ordered List Triangles 5
LOD Ordered List Vertices 9
```

Fig. 2C

```
DistinctLOD 0                                           249
PrecisionMask = 1111111b << 0 = 1111111b       253                        255
LOD Quantized Vertices
   Vertex   Binary[QX,QY,QZ]                    Decimal[QX,QY,QZ],     Model[X,Y,Z]
   0:   [10000101b,10000000b,01111111b],        [133,128,127],         [   5,  0,  -1]
   1:   [10000111b,10000000b,10000011b],        [135,128,131],         [   7,  0,   3]
   2:   [10000011b,10000000b,10000100b],        [131,128,132],         [   3,  0,   4]
   3:   [00000001b,10000000b,10001010b],        [  1,128,138],         [-127,  0,  10]
   4:   [10100111b,10000000b,10011011b],        [167,128,155],         [  39,  0,  27]
   5:   [10100100b,10000000b,10011101b],        [164,128,157],         [  36,  0,  29]
   6:   [10100011b,10000000b,10011100b],        [163,128,156],         [  35,  0,  28]
   7:   [10100010b,10000000b,10011110b],        [162,128,158],         [  34,  0,  30]
   8:   [11111111b,10000000b,01111011b],        [255,128,123],         [ 127,  0,  -5]

Model Triangles
       Triangle Vertices     Result
       0:   [ 0, 1, 2]       -> Ordered Triangle 2:  [ 6, 3, 0]
       1:   [ 4, 5, 6]       -> Ordered Triangle 3:  [ 5, 7, 1]
       2:   [ 6, 5, 7]       -> Ordered Triangle 4:  [ 1, 7, 8]
       3:   [ 2, 6, 3]       -> Ordered Triangle 0:  [ 0, 1, 2]
       4:   [ 1, 8, 4]       -> Ordered Triangle 1:  [ 3, 4, 5]

LOD Ordered List Triangles 5
LOD Ordered List Vertices 9
```

```
                    Ordered Vertex List
Vertex    Binary[QX,QY,QZ]              Decimal[QX,QY,QZ]    Model[X,Y,Z]
  0:  [10000011b,10000000b,10000100b],  [131,128,132],       [   3,  0,   4]
  1:  [10100011b,10000000b,10011100b],  [163,128,156],       [  35,  0,  28]
  2:  [00000001b,10000000b,10001010b],  [  1,128,138],       [-127,  0,  10]
  3:  [10000111b,10000000b,10000011b],  [135,128,131],       [   7,  0,   3]
  4:  [11111111b,10000000b,01111011b],  [255,128,123],       [ 127,  0,  -5]
  5:  [10100111b,10000000b,10011011b],  [167,128,155],       [  39,  0,  27]

Ordered Triangle List
Triangle  Vertices
  0:    [ 0, 1, 2]
  1:    [ 3, 4, 5]

LOD Table
LOD    Triangles    Vertices
 3:        2           6
```

Fig. 3A

```
                    Ordered Vertex List  307
Vertex    Binary[QX,QY,QZ]              Decimal[QX,QY,QZ]   Model[X,Y,Z]
  0:  [10000011b,10000000b,10000100b],  [131,128,132],  [   3, 0,   4]
  1:  [10100011b,10000000b,10011100b],  [163,128,156],  [  35, 0,  28]
  2:  [00000001b,10000000b,10001010b],  [  1,128,138],  [-127, 0,  10]
  3:  [10000111b,10000000b,10000011b],  [135,128,131],  [   7, 0,   3]
  4:  [11111111b,10000000b,01111011b],  [255,128,123],  [ 127, 0,  -5]
  5:  [10100111b,10000000b,10011011b],  [167,128,155],  [  39, 0,  27]
  6:  [10000101b,10000000b,01111111b],  [133,128,127],  [   5, 0,  -1]
  7:  [10100100b,10000000b,10011101b],  [164,128,157],  [  36, 0,  29]

Ordered Triangle List
  Triangle  Vertices
    0:      [ 0, 1, 2]
    1:      [ 3, 4, 5]
    2:      [ 6, 3, 0]
    3:      [ 5, 7, 1]

LOD Table  311
  LOD   Triangles   Vertices
   2:       4          8
   3:       2          6
```

```
Ordered Vertex List
Vertex    Binary[QX,QY,QZ]                    Decimal[QX,QY,QZ]   Model[X,Y,Z]
   0:  [10000011b,10000000b,10000100b],       [131,128,132],      [   3, 0,  4]
   1:  [10100011b,10000000b,10011100b],       [163,128,156],      [  35, 0, 28]
   2:  [00000001b,10000000b,10001010b],       [  1,128,138],      [-127, 0, 10]
   3:  [10000111b,10000000b,10000011b],       [135,128,131],      [   7, 0,  3]
   4:  [11111111b,10000000b,01111011b],       [255,128,123],      [ 127, 0, -5]
   5:  [10100111b,10000000b,10011011b],       [167,128,155],      [  39, 0, 27]
   6:  [10000101b,10000000b,01111111b],       [133,128,127],      [   5, 0, -1]
   7:  [10100100b,10000000b,10011101b],       [164,128,157],      [  36, 0, 29]
   8:  [10100010b,10000000b,10011110b],       [162,128,158],      [  34, 0, 30]

Ordered Triangle List
   Triangle  Vertices
      0:    [ 0, 1, 2]
      1:    [ 3, 4, 5]
      2:    [ 6, 3, 0]
      3:    [ 5, 7, 1]
      4:    [ 1, 7, 8]

LOD Table
   LOD  Triangles  Vertices
    1:      5          9
    2:      4          8
    3:      2          6
```

Fig. 3C

```
                  Ordered Vertex List
Vertex    Binary[QX,QY,QZ]              Decimal[QX,QY,QZ]    Model[X,Y,Z]
0:    [10000011b, 10000000b, 10000100b], [131, 128, 132],   [   3, 0,  4]
1:    [10100011b, 10000000b, 10011100b], [163, 128, 156],   [  35, 0, 28]
2:    [00000001b, 10000000b, 10001010b], [  1, 128, 138],   [-127, 0, 10]
3:    [10000111b, 10000000b, 10000011b], [135, 128, 131],   [   7, 0,  3]
4:    [11111111b, 10000000b, 01111011b], [255, 128, 123],   [ 127, 0, -5]
5:    [10100111b, 10000000b, 10011011b], [167, 128, 155],   [  39, 0, 27]
6:    [10000101b, 10000000b, 01111111b], [133, 128, 127],   [   5, 0, -1]
7:    [10100100b, 10000000b, 10011101b], [164, 128, 157],   [  36, 0, 29]
8:    [10100010b, 10000000b, 10011110b], [162, 128, 158],   [  34, 0, 30]

Ordered Triangle List
Triangle  Vertices
   0:    [ 0, 1, 2]
   1:    [ 3, 4, 5]
   2:    [ 6, 3, 0]
   3:    [ 5, 7, 1]
   4:    [ 1, 7, 8]

LOD Table
LOD  Triangles  Vertices
 0:      5         9
 1:      5         9
 2:      4         8
 3:      2         6
```

Fig. 3D

```
fLOD Calculation

Dist = DistToModel - BoundingSphereRadius
If Dist <= 0
{
    fLOD = 0
}
else
{
    ScreenPixelSize = Dist * tan(0.5 * FOV) / (0.5 * ScreenVerticalPixels)
    QuantUnitPixels = QuantExtent * ScreenPixelSize / ModelScale
    fLOD = log2(QuantUnitPixels)
    if fLOD < 0
    {
        fLOD = 0
    }
    else if fLOD > (DistinctLODs - 1)
    {
        fLOD = DistinctLODs - 1
    }
}
```

Fig. 4

```
                    Vertex Interpolation
iLOD = int(fLOD)
fracLOD = fLOD - iLOD PrecisionMaskA = 11111111b << iLOD
PrecisionMaskB = 11111111b << (iLOD + 1)

for each quantized vertex position
{
    VertexA.QX = ModelVertex.QX & PrecisionMaskA
    VertexA.QY = ModelVertex.QY & PrecisionMaskA
    VertexA.QZ = ModelVertex.QZ & PrecisionMaskA VertexB.QX = ModelVertex.QX & PrecisionMaskB
    VertexB.QY = ModelVertex.QY & PrecisionMaskB
    VertexB.QZ = ModelVertex.QZ & PrecisionMaskB Interp.QX = (1 - fracLOD) * VertexA.QX + fracLOD * VertexB.QX
    Interp.QY = (1 - fracLOD) * VertexA.QY + fracLOD * VertexB.QY
    Interp.QZ = (1 - fracLOD) * VertexA.QZ + fracLOD * VertexB.QZ
}
```

Fig. 5

```
Conversion to Model Space

QUANT_CENTER = 128    ← 603
QUANT_EXTENT = 254    ← 605 for each quantized vertex position
{
    ModelVertex.X = ModelScale * (Interp.QX - QUANT_CENTER) / QUANT_EXTENT    ← 607
    ModelVertex.Y = ModelScale * (Interp.QY - QUANT_CENTER) / QUANT_EXTENT
    ModelVertex.Z = ModelScale * (Interp.QZ - QUANT_CENTER) / QUANT_EXTENT    ← 613
}
```
601 ─┘  609 ─┘

Fig. 6

```
H/V Conversion

ScreenPixelWidth = 640                                   ← 703
ScreenPixelHeight = 480
FOV = 60 degrees
ProjScale = 0.5 * ScreenPixelHeight / tan(0.5 * FOV)     ← 707 for each model space vertex position
{
    VertexDistance = DistToModel + ModelVertex.Y         ← 711
    H = 0.5 * ScreenPixelWidth + ProjScale * ModelVertex.X / VertexDistance
    V = 0.5 * ScreenPixelHeight + ProjScale * ModelVertex.Z / VertexDistance    ← 715
}
```
701 ─┘  705 ─┘  709 ─┘  713 ─┘

Fig. 7

```
Vertex Interpolation and Screen Projection Example at Dist = 2100 fDist = 2100
fLOD = 2.247
iLOD = 2
fracLOD = 0.247
PrecisionMaskA = 11111111b << 2 = 11111100b
PrecisionMaskB = 11111111b << 3 = 11111000b LOD Vertices 8
LOD Triangles 4

Interpolated Quantized Vertices
    Vertex   Binary[QX,QY,QZ]                        Decimal[QX,QY,QZ]   Model[X,Y,Z]
    0:  [10000000,10000000,10000011],  [128,128,131],  [   0, 0,  3]
    1:  [10100000,10000000,10011011],  [160,128,155],  [  32, 0, 27]
    2:  [00000000,10000000,10001000],  [  0,128,136],  [-128, 0,  8]
    3:  [10000011,10000000,10000000],  [131,128,128],  [   3, 0,  0]
    4:  [11111011,10000000,10011000],  [251,128,120],  [ 123, 0, -8]
    5:  [10100011,10000000,10011000],  [163,128,152],  [  35, 0, 24]
    6:  [10000011,10000000,10001011],  [131,128,123],  [   3, 0, -5]
    7:  [10100011,10000000,10011011],  [163,128,155],  [  35, 0, 27]

Projected Vertices
    Vertex   [H,V]
    0:   [ 320, 239]
    1:   [ 326, 235]
    2:   [ 295, 238]
    3:   [ 321, 240]
    4:   [ 344, 242]
    5:   [ 327, 235]
    6:   [ 321, 241]
    7:   [ 327, 235]

Projected Triangles
    Triangle  Vertices     Result
    0:        [0, 1, 2]    Drawn
    1:        [3, 4, 5]    Drawn
    2:        [6, 3, 0]    Drawn
    3:        [5, 7, 1]    Collapsed
```

Fig. 8B

```
Vertex Interpolation and Screen Projection Example at Dist = 2400 fDist = 2400
fLOD = 2.451
iLOD = 2
fracLOD = 0.451
PrecisionMaskA = 11111111b << 2 = 11111100b
PrecisionMaskB = 11111111b << 3 = 11111000b LOD Vertices 8
LOD Triangles 4

Interpolated Quantized Vertices
    Vertex   Binary[QX,QY,QZ]                              Decimal[QX,QY,QZ]    Model[X,Y,Z]
    0:  [10000000,10000000,10000010],                      [128,128,130],       [   0, 0,  2]
    1:  [10100000,10000000,10011010],                      [160,128,154],       [  32, 0, 26]
    2:  [00000000,10000000,10001000],                      [  0,128,136],       [-128, 0,  8]
    3:  [10000010,10000000,10000000],                      [130,128,128],       [   2, 0,  0]
    4:  [11111010,10000000,01111000],                      [250,128,120],       [ 122, 0, -8]
    5:  [10100010,10000000,10011000],                      [162,128,152],       [  34, 0, 24]
    6:  [10000010,10000000,01111010],                      [130,128,122],       [   2, 0, -6]
    7:  [10100010,10000000,10011010],                      [162,128,154],       [  34, 0, 26]

Projected Vertices
    Vertex   [H, V]
    0:  [ 320, 240]
    1:  [ 326, 235]
    2:  [ 298, 239]
    3:  [ 320, 240]
    4:  [ 341, 241]
    5:  [ 326, 236]
    6:  [ 320, 241]
    7:  [ 326, 235]

Projected Triangles
    Triangle Vertices    Result
    0:       [0, 1, 2]   Drawn
    1:       [3, 4, 5]   Drawn
    2:       [6, 3, 0]   Collapsed
    3:       [5, 7, 1]   Collapsed
```

Fig. 8C

SYSTEM AND METHOD FOR IMPROVED RENDERING OF COMPUTER GRAPHIC MODELS

CROSS-REFERENCE TO RELATED APPLICATIONS

This application claims priority to U.S. Provisional Patent Application No. 63/127,913, which was filed Dec. 18, 2020, the disclosures of which is herein incorporated by reference in its entirety and for all purposes.

FIELD

The present disclosure relates generally to data management and video game systems, and more specifically, but not exclusively, to systems and methods for rendering three-dimensional (3D) geometric models using continuous levels of detail (CLODs).

BACKGROUND

Computer games often comprise a graphically rendered three-dimensional (3D) space that represents a virtual world in which the players play the game. This virtual world is typically filled with objects, e.g., characters, rooms, vehicles, items, and environments that are used to create the scene for the game. The game world is communicated to the player through the lens of a virtual camera located a certain position and oriented in a certain way in the environment. Users must be able to perceive the environment of the video game to see what is happening and react accordingly. As the 3D spaces that these games inhabit have become larger and more complex, the task of rendering graphics has become challenging, both computationally and in terms of the effort required to accommodate various camera perspectives and positions at a proper resolution.

A 3D computer graphic model is often used. In particular, the model can be projected and displayed with respect to a virtual/perspective camera that corresponds to the user's viewpoint. When rendering 3D geometric models to a computer screen, there is often a mismatch between the resolution of the geometric detail of the model and the resolution of the computer screen. This mismatch is generally most noticeable when the model is rendered with a perspective camera and the model moves nearer or farther from the camera.

For example, individual surfaces of the model can be represented by varying number of corresponding pixels of the computer screen. More specifically, the model can be represented with a greater number of screen pixels when it is closer to the camera, and with a fewer number of pixels when it is farther from the camera. Accordingly, when displaying the model at an extremely far distance from the camera, processing resources can be wasted when there is generation of model details which, due at least to the reduced number of screen pixels allotted to the model at that distance, can be unappreciated by the user.

To reduce the objectionable visual effects that this causes and to reduce the time spent processing invisible triangles, some conventional systems generate different versions of the 3D models, each having differing complexities or "levels of detail" (LODs). These approaches can include presenting more detailed versions of the model when the model is placed closer to the perspective camera, and less detailed versions of the model when the model is placed farther from the camera. While such approaches may cut down on the waste of certain processing resources by not displaying the model in full-detail when it is far from the camera, other problems are introduced.

For example, different versions of the model are created by hand, thereby increasing workload for a graphic artist. Storing a large quantity of these pre-generated models can take up a large amount of computer memory. Further still, switching between the different models, based on camera distance, can cause a different kind of visual artifact called "popping." To address "popping" issues and reduce manual model creation, progressive mesh (PM) methods have been used; but these methods also increase computational resources and continue to generate additional objectionable visual effects.

In view of the foregoing, there is a need for improved systems and methods for implementing LOD functionality, in an effort to overcome the aforementioned obstacles and deficiencies of conventional approaches.

BRIEF DESCRIPTION OF THE DRAWINGS

FIG. 1B is an exemplary diagram illustrating one embodiment of various data for a 3D computer graphic model that can be used with the CLOD method of FIG. 1A.

FIG. 1C is an exemplary diagram illustrating one embodiment of the results of converting vertex coordinates of FIG. 1B into unsigned 8-bit integers.

FIG. 2C is an exemplary diagram illustrating another embodiment of a distinct LOD with a second-highest level of detail using the CLOD method of FIG. 1A.

FIG. 2D is an exemplary diagram illustrating another embodiment a distinct LOD with a highest level of detail using the CLOD method of FIG. 1A.

FIG. 3A is an exemplary diagram illustrating one embodiment of an ordered triangle list, an ordered vertex list, and a LOD table, corresponding to the distinct LOD of FIG. 2A.

FIG. 3B is an exemplary diagram illustrating another embodiment of an ordered triangle list, an ordered vertex list, and a LOD table, corresponding to the distinct LOD of FIG. 2B.

FIG. 3C is an exemplary diagram illustrating another embodiment of an ordered triangle list, an ordered vertex list, and a LOD table, corresponding to the distinct LOD of FIG. 2C.

FIG. 3D is an exemplary diagram illustrating another embodiment of an ordered triangle list, an ordered vertex list, and a LOD table, corresponding to the distinct LOD of FIG. 2D.

FIG. 4 is an exemplary diagram illustrating one embodiment of floating point LOD (fLOD) calculation logic of the CLOD method of FIG. 1A.

FIG. 5 is an exemplary diagram illustrating one embodiment for vertex interpolation logic of the CLOD method of FIG. 1A.

FIG. 6 is an exemplary diagram illustrating one embodiment of conversion-to-model-space logic of the CLOD method of FIG. 1A.

FIG. 7 is an exemplary diagram illustrating one embodiment of H/V conversion logic of the CLOD method of FIG. 1A.

FIG. 8B is an exemplary diagram illustrating another embodiment of various data regarding example LOD operations for a second distance using the CLOD method of FIG. 1A.

FIG. 8C is an exemplary diagram illustrating another embodiment of various data regarding example LOD operations for a third distance using the CLOD method of FIG. 1A.

Figure 1A:
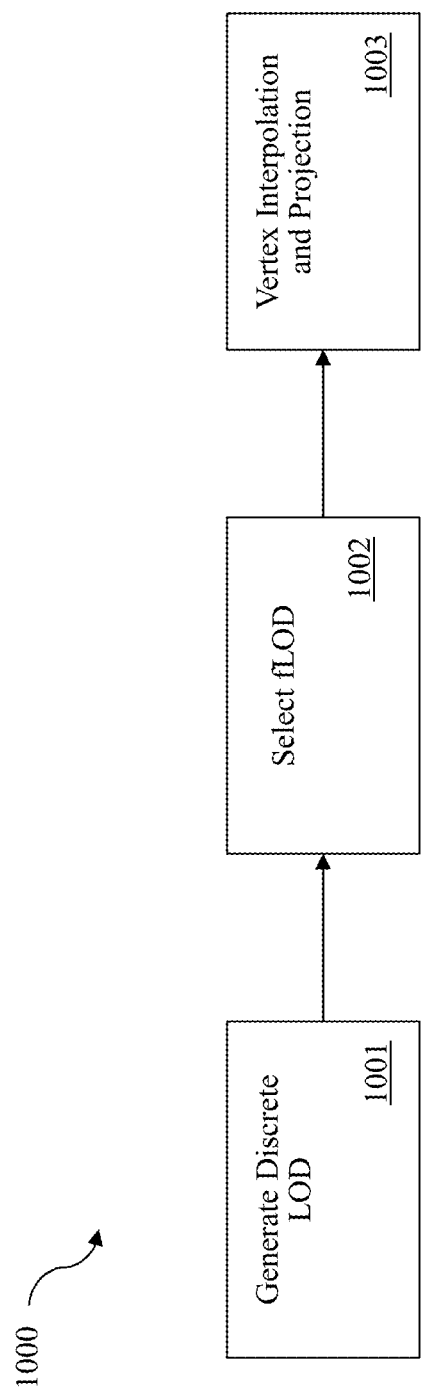
FIG. 1A is an exemplary flow diagram illustrating one embodiment of a method for rending a 3D computer graphic model using a continuous level of detail (CLOD).

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

According to various embodiments, there are provided systems and methods for applying continuous levels of detail (CLODs) to 3D computer graphic models. Turning to FIG. 1A, an exemplary method 1000 for applying CLODs to 3D computer graphic models is shown. As shown, the method 1000 generates one or more distinct levels of detail (LODs) for a given computer graphic model, at 1001. The distinct (or discrete) LOD generation can include quantizing one or more vertices of the model and applying various masks to these vertices. The distinct LOD generation can also include determining the mask application to have caused various model vertices to have become equivalent in value/position in space, and to have caused various model triangles to have collapsed. Where a given triangle has collapsed, the triangle can be removed for purposes of an at-hand distinct LOD. In some embodiments, lists and tables can be built that correspond to the generated distinct LODs.

The method 1000 calculates one or more floating point LOD (fLOD) values based on the generated discrete LODs, at 1002. The fLOD calculation can consider various factors, including but not limited to a distance from the camera, a screen resolution, a field of view, a model scale, a model bounding sphere radius, and so on. Additionally and/or alternatively, the fLOD calculation can consider a visual fidelity parameter, such as, for example, whether to quantize vertices to ¼ pixel boundaries, 1 pixel boundaries, or 2×2 pixel boundaries. For example, a 2×2 pixel boundary can be a better fit for some hardware, but can also introduce visible aliasing issues compared to a single-pixel or ¼ pixel quality. The resultant fLOD value can be indicative of an LOD that can be displayed. In some embodiments, where the fLOD value is a whole number, a corresponding distinct LOD can be displayed. Where the fLOD value is not a whole number, an interpolated LOD can be generated and displayed. Such interpolated LOD generation can include mask application and weighted sum operations. Then, display of a distinct LOD or an interpolated LOD can include vertex dequantization operations, and converting dequantized vertex values from X/Y/Z from to H/V screen coordinates, at 1003. The operations discussed herein can be performed using central processing units (CPU(s)), graphics processing units (GPU(s)), or both. Various aspects will now be discussed in greater detail.

Generation of Distinct LODs (step 1001)

Three-dimensional model data can be pre-processed offline or at run-time prior to floating point LOD level selection (step 1002) as desired. These 3D models are represented by vertex positions, triangles, and other secondary vertex data such as normal vectors and texture UV coordinates. This CLOD method 1000 advantageously manipulates vertex positions and triangles.

Distinct LODs can be generated for an original 3D computer graphic model. In conventional systems, these distinct LODs can be manually hand-generated. However, these hand-generated LODs are time consuming and usually do not contain triangles with the appropriate level of detail for each LOD. The distinct LODs automatically generated by the CLOD method 1000 advantageously guarantees that model triangles with detail too small to be seen at a predefined viewing distance are not included. Instead, each distinct LOD can include only the triangles from the original model that are likely to be visible when viewed at a predefined camera distance. As will be discussed, this is done by creating lower precision vertex positions for each subsequent distinct LOD. As discussed hereinbelow, additional LODs that are intermediate to these distinct LODs can be generated.

Regarding each distinct LOD, coordinate values of vertices of the model can be quantized into maskable forms, such as to n-bit unsigned integers (e.g., to 16-bit unsigned integers). Subsequently, as many as n bitmasks can be generated. A given one of the n bitmasks can have all bits set to 1 except for the m least significant bits (LSBs). Those m LSBs can be set to 0. Within the set of bitmasks, m can range from, as just one example, 0 to n. For example, the set of bitmasks can include a bitmask for which m=3, and for which all n bits except for the three LSBs are set to 1. Those three LSBs can be set to zero.

In some embodiments, each of the bitmasks of the set can be applied to generate a corresponding distinct LOD. Application of a given bitmask can involve, for each vertex of the model, logical operations (e.g., AND) the quantized/maskable-form coordinates of that vertex with the bitmask. As a result, various vertices of the model that differ from one another in terms of value/position-in-space can become equivalent in value/position-in-space. Where such bitmask operation causes two or more vertices of a given triangle of the model to become identical in value/position-in-space, the triangle can be considered collapsed. The collapsed triangles can be removed from the model for the purposes of the at-hand distinct LOD, thereby yielding a LOD which is simpler than the original model. In this way, application of the set of bitmasks can generate a set of distinct LODs, one for each applied bitmask.

In some embodiments, at least two ordered lists can be generated: a) an ordered triangle list; and b) an ordered vertex list. Additionally, an LOD table which references, for each distinct LOD, the triangles and vertices that are utilized by the distinct LOD can be generated. Generation of distinct LODs will now be discussed in greater detail, including with reference to an illustrative example.

Turning to FIG. 1B, exemplary data is shown that define a 3D computer graphic model. FIG. 1B shows vertex position data 101 (expressed in model space units) and triangle data 103 that define the example model. In this example, they component of each vertex is set to 0 for ease of illustration of data manipulation described herein. As used herein, the units used by the original model to represent the vertex position is referred to as model space.

The triangle data shown in FIG. 1B represents a given triangle in terms of the vertices spanned by its sides. For instance, triangle "0" has: a) a side spanning vertex "0" (i.e., [5, 0, −1]) and vertex "1" (i.e., [7, 0, 3]); b) a side spanning vertex "1" and vertex "2" (i.e., [3, 0, 4]); and c) a side spanning vertex "2" and vertex "0." FIG. 1B also shows a ModelScale value 105 and BoundingSphereRadius value 107. The ModelScale value 105 defines the range of vertex position values along the longest axis, while the BoundingSphereRadius value 107 indicates the distance from the farthest vertex position to the origin. These values 105 and 107 can be used in later stages.

As noted, generation of distinct LODs can include quantization of the coordinate values of the vertices of the model to be stored as integers. The vertices can be quantized to 8-bit unsigned integers for illustration purposes only. However, in various embodiments, a quantization approach which allows for more precision and/or range of vertex positions can be used as desired (e.g., an unsigned 16-bit or unsigned 32-bit representation can be used). Additionally and/or alternatively, signed integers can be used instead of/in addition to unsigned integers.

Turning to FIG. 1C, the results of converting the signed vertex coordinates into unsigned 8-bit integers are shown. In particular, FIG. 1C illustrates the results of the conversion in binary form 109 and in decimal form 111. Each vertex shows the binary representation and decimal representation of the unsigned 8-bit value along with the equivalent model space value if the unsigned 8-bit value was converted back to model space. FIG. 1C also shows the corresponding pre-quantization/model space coordinates for each vertex (113). Although the example shows a range of values of vertex positions that fit within an 8-bit integer, the CLOD method 1000 does not limit the vertex positions to fit in a predefined integer.

Once the vertex positions have been converted to integers, the number of distinct LODs (or "DistinctLODs" as used herein) is chosen. As referenced, for an n-bit unsigned integer, as many as n bitmasks—and therefore as many as n distinct LODs—can be generated. According to the illustrative example, as many as eight bitmasks—and therefore as many as eight distinct LODs—can be generated. Such individual distinct LODs can be numbered from n−1 (for the lowest level of detail) to 0 (for the highest level of detail), where n is 8 according to the example. Each distinct LOD includes only triangles from the original model that are likely to be visible when viewed at a particular camera distance. In some embodiments, this is done by creating lower precision vertex positions for each subsequent distinct LOD.

However, in various embodiments, a choice can be made to generate fewer than such a maximum quantity of bitmasks/distinct LODs. Such choice can constitute a quantity of distinct LODs selection step. As just one example, of the possible maximum number of LODs that can be generated, a certain quantity q of the least-detailed of those LODs can be found to be inappropriate for a given application (e.g., being considered to overly undetailed). As such, the decision can be made to generate neither those q LODs nor the corresponding q bitmasks.

In line with this, according to the illustrative example, of the eight possible distinct LODs the four LODs with the least level of detail can be considered to be overly undetailed. As such, the illustrative generates only the four most detailed ones of the possible eight distinct LODs, and only generates the bitmasks which correspond to those four most detailed LODs.

Further, when lower quality LODs are generated by masking out vertex position LSBs, each successive reduction in quality does not necessarily result in a significant reduction in the number of vertices or triangles. As such, in some embodiments a determination can be made as to whether or not a particular generated lower quality LOD is sufficiently similar (e.g., in terms of number of triangles and/or vertices) to its next highest quality generated LOD. Where the lower quality LOD is found to be sufficiently similar, that LOD can be eliminated from the list of LODs. In this way, benefits including saving of memory can accrue. In certain embodiments, the next highest quality LOD can instead be eliminated from the list.

To optimize the usage of the list of vertex positions and the list of triangles, an ordered version of each list is created. These ordered lists are initially empty and are populated processing the distinct LODs from the lowest detail level of detail to the highest level of detail. These ordered lists allow all of the distinct LODs to share vertices and triangles.

Figure 2A:
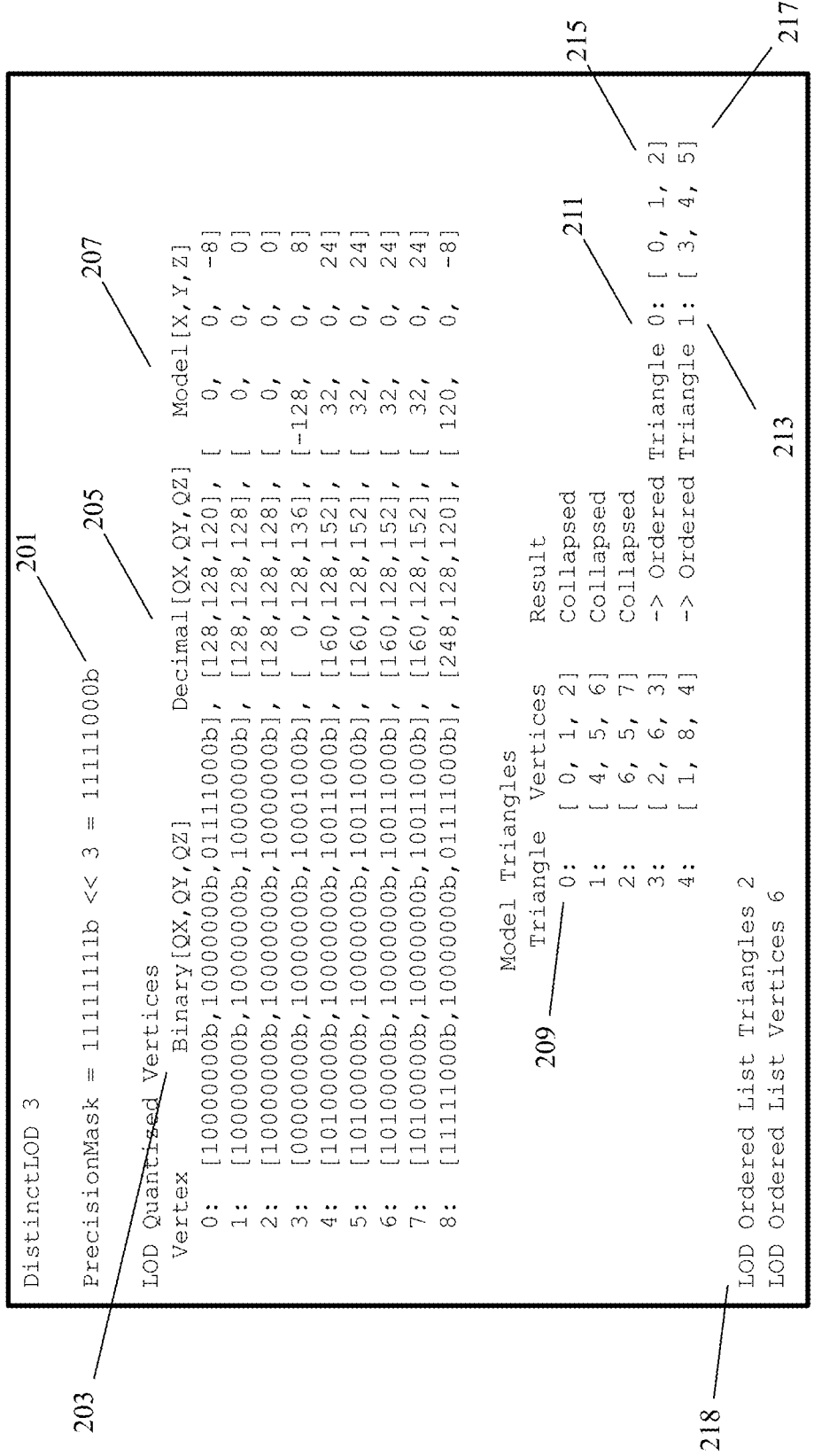
FIG. 2A is an exemplary diagram illustrating one embodiment a distinct LOD with a lowest level of detail using the CLOD method of FIG. 1A.

Turning to FIG. 2A, shown is various information regarding the processing of "DistinctLOD3"—the distinct LOD with the lowest level of detail. As referenced, for each distinct LOD, a bitmask (shown as "PrecisionMask" in FIGS. 2A-2D) can be generated, the bitmask having all bits set to 1 except for the m LSBs, which are set to 0. The value of m can be the DistinctLOD number, thus m being 3 for DistinctLOD3 of FIG. 2A. One approach to such bitmask generation can be to, for a given distinct LOD, create the bitmask by taking a binary value of all ones and shifting it left by the DistinctLOD number (e.g., by 3 for DistinctLOD3 of FIG. 2A). For the example distinct LOD of FIG. 2A, the bitmask can be 11111000b (201).

As noted, bitmask application can involve, for vertex, ANDing the quantized coordinates of that vertex with the bitmask. In other words, the PrecisionMask 201 can be ANDed with the quantized X/Y/Z components/coordinates of each vertex of the model (shown in FIG. 1C). The resultant values are shown in the "LOD Quantized Vertices" table of FIG. 2A, which shows the resultant values in binary form 203 and in decimal form 205. Also shown are the corresponding masked un-quantized/model space coordinates for each vertex (207). By comparing the post-masking vertex values of FIG. 2A with the corresponding pre-masking vertex values of FIG. 1C, the loss of precision can be appreciated. For instance, vertex "0" has post-masking coordinates [128, 128, 120] (decimal form), but pre-masking coordinates [133, 128, 127] (decimal form). It is noted that, hereinthroughout, a number placed in quotes when discussing a vertex generally indicates that such vertex is being referred to according to model numbering, rather than, say, according to below-discussed ordered vertex numbering.

As referenced, bitmask application can cause vertices which had been different in terms of value/position-in-space to become equivalent in value/position in space. As also referenced, where this causes two or more vertices of a given triangle to become identical in value/position-in-space, the triangle can be considered "collapsed." As such, the processing of DistinctLOD3 can include examining the triangles of the model and determining whether any have collapsed in this way. Considering DistinctLOD3, triangle "0" (209) is made up of vertices "0," "1," and "2." Then, looking at the "LOD Quantized Vertices" table, it can be determined that the application of the 11111000b bitmask has caused vertices "1" and "2" to become equivalent (e.g., as reflected by the table, vertices "1" and "2" both have the value [128, 128, 128], decimal). As such, triangle "0" can be collapsed. Likewise, triangle "1" has collapsed due to its constituent vertices—vertices "4," "5," and "6"—having become equivalent in value. Further likewise, triangle "2" has collapsed due to its constituent vertices—vertices "5," "6," and "7"—having become equivalent in value. On the other hand, for triangles "3" and "4" the bitmask application has not caused any constituent vertices to become equivalent. As such, neither triangle "3" nor triangle "4" has collapsed. It is noted that, hereinthroughout, a number placed in quotes when discussing a triangle generally indicates that such triangle is being referred to according to model numbering, rather than, say, according to below-discussed ordered triangle numbering.

As referenced, where the application of a bitmask, in pursuit of creation of a distinct LOD for a model, causes a given triangle of the model to collapse, such a triangle can be removed from the model for the purposes of that distinct LOD. As such, collapsed triangles "0," "1," and "2" can be removed from the model for the purposes of distinctLOD3.

An ordered triangle list and an ordered vertex list can, as noted, be generated. These ordered lists can initially be empty and can then be populated by processing the distinct LODs from the lowest detail level of detail to the highest level of detail. These ordered lists can allow all of the distinct LODs to share vertex and triangle data. For the illustrative example—where only the four most detailed of the possible eight distinct LODs are being generated—the ordered triangle list and the ordered vertex list can be populated: a) according to distinct LOD 3; b) then according to distinct LOD 2; c) then according to distinct LOD 1; d) finally according to distinct LOD 0.

Population of the ordered triangle list can be performed such that: a) a given triangle is listed in the ordered triangle list no more than once, although multiple distinct LODs can include the triangle; b) a given triangle is added to the ordered triangle list the first time—when processing the distinct LODs from the lowest detail level of detail to the highest level of detail—it is found to be an uncollapsed triangle; c) upon addition of the triangle to the ordered triangle list as per "b)," the triangle is assigned a next available sequential ordered triangle number; d) when adding a given triangle to the list, listed along with it are its component vertices specified via their ordered vertex numbers; e) such an ordered vertex number is assigned to a vertex the first time—when processing the distinct LODs from the lowest detail level of detail to the highest level of detail—it is added to the ordered triangle list; and f) the ordered vertex number assignment as per "e)" involves the vertex being assigned a next available sequential ordered vertex number.

Furthermore, when a vertex is first added to the ordered triangle list, it can also be added to the ordered vertex list, in terms of its ordered vertex number. When so added, listed along with it are its unmasked coordinates, specified in one or more of: a) quantized binary form; b) quantized decimal form; c) un-quantized/model space coordinates. As to the noted LOD table, a given distinct LOD can be added to the table upon completion of the ordered triangle list and ordered vertex list operations for the distinct LOD. In adding a given distinct LOD to the table, listed for the LOD can be a "triangles" value tr and a "vertices" value vt. The "triangles" value can indicate that the corresponding distinct LOD uses the first tr triangles, according to ordered triangle numbering. Likewise, the "vertices" value can indicate that the corresponding distinct LOD uses the first vt vertices, according to ordered vertex numbering. As an illustration, for a given distinct LOD a "triangles" value of 2 and a "vertices" value of 6 can indicate that the LOD uses triangles 0 through 1 (ordered triangle numbering), and that the LOD uses vertices 0-5 (ordered vertex numbering).

Considering the population of the ordered triangle list with respect to the least detailed distinct LOD of the illustrative example—DistinctLOD3—the following is noted. As mentioned, for distinct LOD 3, neither triangle "3" nor triangle "4" has collapsed. As these triangles have not collapsed, and as these triangles do not yet appear in the ordered triangle list—the list being empty at this juncture—these triangles are added to the list. As these are the first two triangles which are added to the ordered triangle list, they are assigned the first two ordered triangle numbers. In particular, triangle "3" is assigned ordered triangle number 0 when added to the list (211). Further in particular, triangle "4" is assigned ordered triangle number 1 when added to the list (213).

Triangle "3" (ordered triangle number 0) includes vertex "2," vertex "6," and vertex "3" (see FIGS. 1B and 2A). Then, triangle "4" (ordered triangle 1) includes vertex "1," vertex "8," and vertex "4" (see FIGS. 1B and 2A). Next, the vertices of each of these triangles can be added to the ordered triangle list, specified via their ordered vertex numbers. As none of these vertices have been yet added to ordered triangle list (the ordered triangle list not yet listing any vertices), these unique six vertices are assigned the first six ordered vertex numbers. In particular, considering the vertices of ordered triangle 0 (215): a) vertex "2" is assigned ordered vertex number 0 when added to the ordered triangle list; b) vertex "6" is assigned ordered vertex number 1 when added to the ordered triangle list; and c) vertex "3" is assigned ordered vertex number 2 when added to the ordered triangle list. Then, considering the vertices of ordered triangle 1 (217): a) vertex "1" is assigned ordered vertex number 3 when added to the ordered triangle list; b) vertex "8" is assigned ordered vertex number 4 when added to the ordered triangle list; and c) vertex "4" is assigned ordered vertex number 5 when added to the ordered triangle list. Shown in FIG. 3A is ordered triangle list 301, according to the processing of DistinctLOD3.

As noted, when a given vertex is first added to the ordered triangle list, it can also be added to the ordered vertex list, in terms of its ordered vertex number. As such, shown in FIG. 3A is ordered vertex list 303. Here, for each of ordered vertex number 0-ordered vertex number 5, shown for the vertex are its unmasked coordinates, specified in: a) quantized binary form; b) quantized decimal form; and c) un-quantized/model space coordinates. As to the LOD table, shown in FIG. 3A is LOD table 305. Here, for Distinct-LOD3, the "triangles" value is 2 and the "vertices" value is 6. As such, LOD table 305 indicates that DistinctLOD3 uses triangles 0 through 1 (ordered triangle numbering), and that the DistinctLOD3 uses vertices 0-5 (ordered vertex numbering), consistent with the foregoing discussion. In keeping with this, FIG. 2A sets forth (218) "LOD Ordered List Triangles 2" and "LOD Ordered List Vertices 6."

Figure 2B:
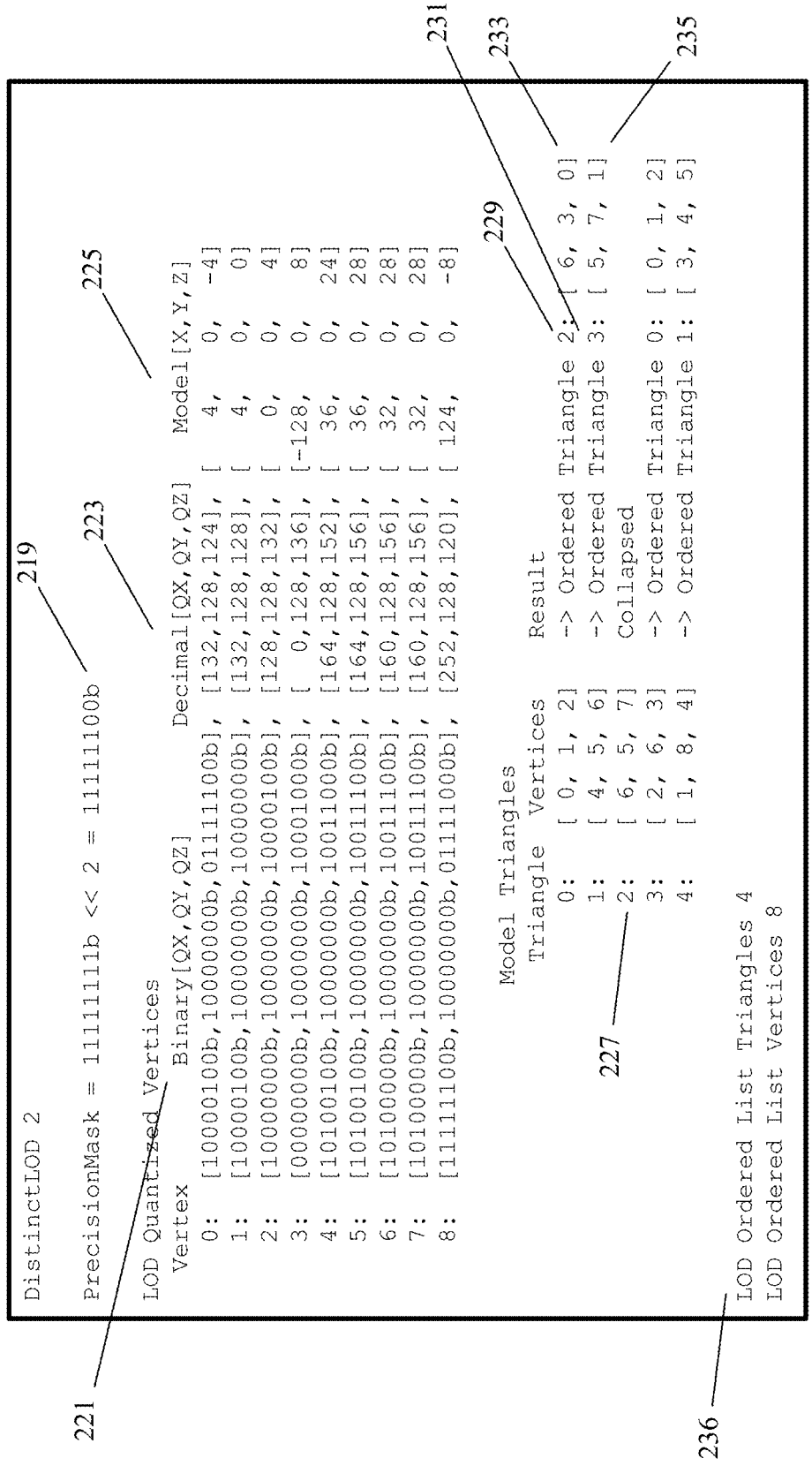
FIG. 2B is an exemplary diagram illustrating another embodiment of a distinct LOD with a second-lowest level of detail using the CLOD method of FIG. 1A.

Continuing with the illustrative example, turning to FIG. 2B, shown is various information regarding the processing of "DistinctLOD2," the distinct LOD with the second-lowest level of detail. As the distinct LOD number for DistinctLOD2 is 2, the bitmask generated for DistinctLOD2 can have all bits set to 1 except for the two LSBs, which are set to 0. As such, the bitmask for DistinctLOD2 can be 11111100b (219). Subsequent to its generation, Precision-Mask 219 can be ANDed with the quantized X/Y/Z components/coordinates of each vertex of the model. The resultant values are shown in the "LOD Quantized Vertices" table of FIG. 2B, which shows the resultant values in binary form 221 and decimal form 223. Also shown are the corresponding masked un-quantized/model space coordinates for each vertex (225). By comparing the post-masking vertex values of FIG. 2B with: a) the corresponding pre-masking vertex values of FIG. 1C; and b) the corresponding post-masking vertex values of FIG. 2A, it can be seen that DistinctLOD2 exhibits greater precision than DistinctLOD3, in keeping with the bitmask for DistinctLOD2 having fewer zeroed-out bits than the bitmask for DistinctLOD3.

As a further step, the processing of DistinctLOD2 can include examining the triangles of the model and determining whether any have collapsed due to the application of bitmask 219 having caused model vertices to have become equivalent in value/position in space. Considering Distinct-LOD2, triangle "2" (227) is made up of vertices "6," "5," and "7." Then, looking at the "LOD Quantized Vertices" table, it can be determined that the application of bitmask 219 has caused vertices "6" and "7" to become equivalent. As such, triangle "2" has collapsed. On the other hand, the application of bitmask 219 has not caused any other triangles of the model to have collapsed. Accordingly, collapsed triangle "2" can be removed from the model for the purposes of distinctLOD2.

The population of the ordered triangle list with respect to DistinctLOD2 will now be considered. As none of triangles "0," "1," "3," and "4" have collapsed, with the processing of DistinctLOD2 the ordered triangle list should contain all four of these triangles. However, no action need be taken to add triangles "3" and "4", because these triangles have already been added to the ordered triangle list in connection with the processing for DistinctLOD3. Likewise, the vertices of these triangles have already been added to the ordered triangle list and ordered vertex list via the processing for DistinctLOD3.

On the other hand, triangles "0" and "1" do not yet appear in the ordered triangle list, these triangles are added to the ordered triangle list. They are assigned the next two available sequential ordered triangle numbers. In particular, triangle "0" is assigned ordered triangle number 2 when added to the list (229). Further in particular, triangle "1" is assigned ordered triangle number 3 when added to the list (231).

Next, the vertices of ordered triangle 2 and ordered triangle 3 can be added to the ordered triangle list, specified via their ordered vertex numbers. Considering ordered triangle 2, this triangle includes vertices "0," "1," and "2." Of these vertices, vertices "1" and "2" have already been assigned ordered vertex numbers via the processing of DistinctLOD3, the vertices being assigned ordered vertex number 3 and ordered vertex number 0, respectively. On the other hand, vertex "0" has not yet been assigned an ordered vertex number. As such, this vertex can be assigned the next available sequential ordered vertex number, ordered vertex number 6. In this way, the vertices of ordered triangle 2 can be added (233) to the ordered triangle list as ordered vertex number 6, ordered vertex number 3, and ordered vertex number 0, respectively. Turning to ordered triangle 3, this triangle includes vertices "4," "5," and "6." Of these vertices, vertices "4" and "6" have already been assigned ordered vertex numbers via the processing of DistinctLOD3, the vertices being assigned ordered vertex number 5 and ordered vertex number 1, respectively. On the other hand, vertex "5" has not yet been assigned an ordered vertex number. As such, this vertex can be assigned the next available sequential ordered vertex number, ordered vertex number 7. In this way, the vertices of ordered triangle 3 can be added (235) to the ordered triangle list as ordered vertex number 5, ordered vertex number 7, and ordered vertex number 1, respectively. Shown in FIG. 3B is ordered triangle list 307, according to the processing of DistinctLOD2. Ordered triangle list 307 corresponds to the same ordered triangle list as depicted by FIG. 3A, but with additional data added.

As ordered vertex 6 and ordered vertex 7 have been first added to the ordered triangle list via the processing for DistinctLOD2, the processing for DistinctLOD2 can further include adding these vertices to the ordered vertex list, in terms of their ordered vertex numbers. Accordingly, ordered vertex list 309 of FIG. 3B, which depicts the ordered vertex list as altered by the processing for DistinctLOD2, reflects the addition of data for ordered vertex number 6 and ordered vertex number 7, relative to the ordered vertex list as altered by the processing for DistinctLOD3 (see FIG. 3A). Ordered vertex list 309 corresponds to the same ordered vertex list as depicted by FIG. 3A, but with additional data added. In particular, ordered vertex list 309 of FIG. 3B shows, for each of ordered vertex number 6 and ordered vertex number 7, corresponding unmasked specified in: a) quantized binary form; b) quantized decimal form; and c) un-quantized/model space coordinates.

As to the LOD table, shown in FIG. 3B is LOD table 311. LOD table 311 corresponds to the same LOD table as depicted by FIG. 3A, but with additional data added. Relative to the LOD table as depicted by FIG. 3A and reflecting the processing for DistinctLOD3, the LOD table as depicted by FIG. 3B (311) reflects the processing for DistinctLOD2 and adds a corresponding table entry. In particular, added to the LOD table is an entry for DistinctLOD2. For this new entry, the "triangles" value is 4 and the "vertices" value is 8. As such, LOD table 311 indicates that DistinctLOD2 uses triangles 0 through 3 (ordered triangle numbering), and that the DistinctLOD2 uses vertices 0 through 7 (ordered vertex numbering), consistent with the foregoing discussion. In keeping with this, FIG. 2B sets forth (236) "LOD Ordered List Triangles 4" and "LOD Ordered List Vertices 8."

Continuing further with the illustrative example, turning to FIG. 2C, shown is various information regarding the processing of "DistinctLOD1," the distinct LOD with the second-highest level of detail. As the distinct LOD number for DistinctLOD1 is 1, the bitmask generated for DistinctLOD1 can have all bits set to 1 except for the LSB, which is set to 0. As such, the bitmask for DistinctLOD1 can be 11111110b (237). Subsequent to its generation, PrecisionMask 237 can be ANDed with the quantized X/Y/Z components/coordinates of each vertex of the model. The resultant values are shown in the "LOD Quantized Vertices" table of FIG. 2C, which shows the resultant values in in binary form 239 and decimal form 241. Also shown are the corresponding masked un-quantized/model space coordinates for each vertex (243). By comparing the post-masking vertex values of FIG. 2C with: a) the corresponding pre-masking vertex values of FIG. 1C; b) the corresponding post-masking vertex values of FIG. 2A; and c) the corresponding post-masking vertex values of FIG. 2B, it can be seen that DistinctLOD1 exhibits greater precision than both DistinctLOD3 and DistinctLOD2, in keeping with the bitmask for DistinctLOD1 having fewer zeroed-out bits than both the bitmask for DistinctLOD3 and the bitmask for DistinctLOD2.

As a further step, the processing of DistinctLOD1 can include examining the triangles of the model and determining whether any have collapsed due to the application of bitmask 237 having caused model vertices to have become equivalent in value/position in space. For DistinctLOD1, it can be determined that the application of bitmask 237 has caused no vertices to become equivalent. As such, the application of bitmask 237 has caused no triangles of the model to have collapsed, therefore there are no triangles that are to be removed from the model for the purposes of distinctLOD1.

The population of the ordered triangle list with respect to DistinctLOD1 will now be considered. As none of the triangles have collapsed, with the processing of DistinctLOD1 the ordered triangle list should contain all triangles of the model (i.e., triangles "0," "1," "2," "3," and "4"). However, no action need be taken to add triangles "0," "1," "3," and "4" because these triangles have already been added to the ordered triangle list in connection with the processing for the preceding distinct LODs. Likewise, the vertices of these triangles have already been added to the ordered triangle list and ordered vertex list via the processing for the preceding distinct LODs.

On the other hand, as triangle "2" does not yet appear in the ordered triangle list, this triangle is added to the ordered triangle list. It is assigned the next available sequential ordered triangle number—ordered triangle number 4—when added to the list (247).

Next, the vertices of ordered triangle 4 can be added to the ordered triangle list, specified via their ordered vertex numbers. Ordered triangle 4 includes vertices "6," "5," and "7." Of these vertices, vertices "6" and "5" have already been assigned ordered vertex numbers via the processing of the preceding distinct LODs, the vertices being assigned ordered vertex number 1 and ordered vertex number 7, respectively. On the other hand, vertex "7" has not yet been assigned an ordered vertex number. As such, this vertex can be assigned the next available sequential ordered vertex number, ordered vertex number 8. In this way, the vertices of ordered triangle 4 can be added (247) to the ordered triangle list as ordered vertex number 1, ordered vertex number 7, and ordered vertex number 8, respectively. FIG. 3C shows an ordered triangle list 313, according to the processing of DistinctLOD1. Ordered triangle list 313 corresponds to the same ordered triangle list as depicted by FIGS. 3A and 3B, but with additional data added.

As ordered vertex 8 has been first added to the ordered triangle list via the processing for DistinctLOD1, the processing for DistinctLOD1 can further include adding this vertex to the ordered vertex list, in terms of its ordered vertex number. Accordingly, ordered vertex list 315 of FIG. 3C, which depicts the ordered vertex list as altered by the processing for DistinctLOD1, reflects the addition of data for ordered vertex number 8, relative to the ordered vertex list as altered by the processing for DistinctLOD2 (see FIG. 3B). Ordered vertex list 315 corresponds to the same ordered vertex list as depicted by FIGS. 3A and 3B, but with additional data added. In particular, ordered vertex list 315 of FIG. 3C shows for ordered vertex number 8 corresponding unmasked coordinates specified in: a) quantized binary form; b) quantized decimal form; and c) un-quantized/model space coordinates.

As to the LOD table, shown in FIG. 3C is LOD table 317. LOD table 317 corresponds to the same LOD table as depicted by FIGS. 3A and 3B, but with additional data added. Relative to the LOD table as depicted by FIG. 3B and reflecting the processing for DistinctLOD2, the LOD table as depicted by FIG. 3C (317) reflects the processing for DistinctLOD1 and adds a corresponding table entry, an entry for DistinctLOD1. For this new entry, the "triangles" value is 5 and the "vertices" value is 9. As such, LOD table 317 indicates that DistinctLOD1 uses triangles 0 through 4 (ordered triangle numbering), and that the DistinctLOD1 uses vertices 0 through 8 (ordered vertex numbering), consistent with the foregoing discussion. In keeping with this, FIG. 2C sets forth (248) "LOD Ordered List Triangles 5" and "LOD Ordered List Vertices 9."

Continuing still further with the illustrative example, turning to FIG. 2D, shown is various information regarding the processing of "DistinctLOD0," the distinct LOD with the highest level of detail. As the distinct LOD number for DistinctLOD0 is 0, the bitmask generated for DistinctLOD0 can have all bits set to 1 (i.e., with a distinct LOD number of 0, there are zero/no LSBs to be set to zero). As such, the bitmask for DistinctLOD1 can be 11111111b (249). Subsequent to its generation, PrecisionMask 249 can be ANDed with the quantized X/Y/Z components/coordinates of each vertex of the model. The resultant values are shown in the "LOD Quantized Vertices" table of FIG. 2D, which shows the resultant values in in binary form 251 and decimal form 253. Also shown are the corresponding masked un-quantized/model space coordinates for each vertex (253). By comparing the post-masking vertex values of FIG. 2D with the corresponding pre-masking vertex values of FIG. 1C, it can be seen that DistinctLOD0 exhibits the same precision as those pre-masking vertex values of FIG. 1C. Such is in keeping with the all-1's nature of the bitmask for DistinctLOD0. It is noted that, in various embodiments, such an all-1's bitmask can be neither generated nor applied, with the pre-masking vertex values instead being considered the result of bit mask application for the purposes of further processing.

As a further step, the processing of DistinctLOD0 can include examining the triangles of the model and determining whether any have collapsed due to the application of bitmask 249 having caused model vertices to have become equivalent in value/position in space. For DistinctLOD0, it can be determined that the application of bitmask 249 has caused no vertices to become equivalent. As such, the application of bitmask 249 has caused no triangles of the model to have collapsed, and therefore there are no triangles that are to be removed from the model for the purposes of distinctLOD0. According to various embodiments, it can be recognized that: a) the application of an all-1's bitmask to the pre-masking vertex values yields the pre-masking vertex values themselves; b) that a distinct LOD which utilizes an all-1's bitmask (e.g., as is the case for DistinctLOD0 of the example) will be equivalent to the core model; and c) it can be known, without explicit processing, that no triangles of the model have collapsed for the purposes of that distinct LOD. Additionally and/or alternatively, when the core model is scaled and fitted to an unsigned integer as shown in FIG. 1C, the model can include collapsed triangles.

The population of the ordered triangle list with respect to DistinctLOD0 will now be considered. As none of the triangles have collapsed, with the processing of DistinctLOD0 the ordered triangle list should contain all triangles of the model (i.e., triangles "0," "1," "2," "3," and "4"). However, no action need be taken to add any of these triangles as all triangles of the model have already been added to the ordered triangle list in connection with the processing for the preceding distinct LODs. Likewise, the vertices of all triangles of the model have already been added to the ordered triangle list and ordered vertex list via the processing for the preceding distinct LODs. In keeping with this, shown in FIG. 3D is the ordered triangle list 319 according to the processing of DistinctLOD0, this ordered triangle list being equivalent to the ordered triangle list according to the processing of DistinctLOD1 (see 313 of FIG. 3C). Ordered triangle list 319 corresponds to the same ordered triangle list as depicted by FIGS. 3A-3C. Further in keeping with this, shown in FIG. 3D is the ordered vertex list 321 of FIG. 3D according to the processing of DistinctLOD0, this ordered vertex list being equivalent to the ordered vertex list according to the processing of DistinctLOD1 (see 315 of FIG. 3C). Ordered vertex list 321 corresponds to the same ordered vertex list as depicted by FIGS. 3A-3C. The ordered triangle list 319 and ordered vertex list 321 thus show these lists subsequent to processing of all distinct LODs of the illustrative example (i.e., the processing of DistinctLOD3 through DistinctLOD0).

As to the LOD table, shown in FIG. 3D is LOD table 323. LOD table 323 corresponds to the same LOD table as depicted by FIGS. 3A-3C, but with additional data added. Relative to the LOD table as depicted by FIG. 3C and reflecting the processing for DistinctLOD1, the LOD table as depicted by FIG. 3D (323) reflects the processing for DistinctLOD0 and adds a corresponding table entry, an entry for DistinctLOD0. For this new entry, the "triangles" value is 5 and the "vertices" value is 9. As such, LOD table 323 indicates that DistinctLOD0 uses triangles 0 through 4 (ordered triangle numbering), and that the LOD uses vertices 0 through 8 (ordered vertex numbering), consistent with the foregoing discussion. Then, FIG. 2D sets forth (257) "LOD Ordered List Triangles 5" and "LOD Ordered List Vertices 9." The LOD table 323 shows the LOD table subsequent to processing of all distinct LODs of the illustrative example (i.e., the processing of DistinctLOD3 through DistinctLOD0). According to the illustrative example, both DistinctLOD1 and DistinctLOD0 are equivalent distinct LODs.

The discussed operations regarding generation of distinct LODs can, for example, be performed at a pre-processing stage (e.g., using an off-line software tool), or otherwise performed ahead of a run-time calculation of a floating point LOD (fLOD) value, which is discussed below.

Via the operations discussed in connection with FIGS. 2A-2D and 3A-3D, distinct LODs including certain vertices and certain triangles can be generated. In various embodiments, those vertices of a model that are controlled by bone matrices can be included in all distinct LODs. In this way, models that use skinning (e.g., models that contain submeshes that animate with bone matrices can be supported by, for instance, taking into account that vertices which are affected by bone matrices can move relative to other vertices, even when they have the same vertex positions.

Moreover, in various embodiments where virtual bones are employed, model vertices can be appropriately sorted prior to the performance of the operations discussed in connection with FIGS. 2A-3D. Such virtual bones can be found in models that include animated limbs/sections which are each divided into a hierarchy of subsections controlled by one or more matrices called bones. These bones can allow these subsections to move (e.g., rotate). As such, a given vertex in a model can be controlled by one or more such bones. When groups of vertices are controlled with the same set of bones, these bones can be mathematically combined into a matrix concatenation called a virtual bone.

Further, discussed above in connection with FIGS. 2A-2D is a bitmask approach including: a) creating the bitmask for a given distinct LOD by taking a binary value of all ones and shifting it left by the DistinctLOD number; b) applying this bitmask to a given vertex by ANDing the quantized coordinates of that vertex with the bitmask. However, according to various embodiments other approaches can be taken. For example, instead of ANDing the quantized coordinates of the vertex with the bitmask, the quantized coordinates of the vertex can be ORed with the bitwise NOT of the bitmask. As yet another example, according to various embodiments the following bitmask approach can be taken:

```
if DistinctLODNumber == 0
{
    ResultantValue = OriginalValue
}
else
{
    ResultantValue = (OriginalValue & (11111111b <<
DistinctLODNumber)) | (00000001b << (DistinctLODNumber−1))
}
```

Here, OriginalValue can correspond to a quantized X, Y, or Z coordinate of a given vertex prior to mask application, while ResultantValue can correspond to that vertex coordinate after mask application. As illustrated by the sample code, where the DistinctLOD number is zero, the quantized vertex coordinate can be left unchanged. Further, where the DistinctLOD number is not zero, the quantized vertex coordinate can be set to the OR of: a) generating a first bitmask by taking a binary value of all ones and shifting it left by the DistinctLOD number and ANDing the quantized coordinate with the first bitmask; and b) generating a second bitmask by taking a binary value of all zeros except for a 1-valued LSB and shifting it left by one less than the DistinctLOD number.

Selection of Floating Point LOD Level (Step 1002)

When rendering a model to the screen, it is necessary to select the appropriate LOD for a given model distance from the camera. Selecting a LOD with too much detail wastes compute power when triangles are too small to resolve on the screen. Selecting a LOD with too little detail will result in poor quality when potential detail is missing.

So as to support display of the model to the screen, a floating point LOD (fLOD) value can be calculated. In particular, the calculation of the fLOD value can take into account factors including the size of screen pixels for an at-hand distance from the camera to the model and the scale of the model. Where fLOD holds a whole number value, a distinct LOD can be displayed. And, where fLOD holds a non-whole-number value, an interpolated LOD can be generated and displayed (e.g., displayed transitionally). Higher values of fLOD can trend towards less-detailed LODs, while lower values of fLOD can trend toward more-detailed LODs. Interpolated LOD generation discussed in greater detail below.

fLOD calculation is now discussed, with reference to the illustrative code of FIG. 4. This calculation attempts to match the minimum detail in each distinct LOD (generated in the previous section), to the size of a pixel on the screen at a given distance from the camera to the model. Turning to FIG. 4, line 401 indicates that the fLOD value can be set to log 2(QuantUnitPixels) where the fLOD value is not set according to the edge case handling of if block 403 (discussed later). In line 401, QuantUnitPixels refers to a value defined at line 405. More generally, QuantUnitPixels can be set according to the number of screen pixels for each unit of the quantized vertex position coordinates. As fLOD is set according to the binary logarithm of QuantUnitPixels, there is a positive correlation between fLOD and QuantUnitPixels. As such: a) fLOD is driven higher (i.e., towards less-detailed LODs) by higher values of QuantUnitPixels; and b) fLOD is driven lower (i.e., towards more-detailed LODs) by lower values of QuantUnitPixels.

As referenced, QuantUnitPixels can be set according to line 405. In particular, at line 405 QuantUnitPixels can be set according to the values of: a) QuantExtent; b) ScreenPixelSize; and c) ModelScale.

Because of the positive correlation between fLOD and QuantUnitPixels, there is a positive correlation between fLOD and QuantExtent. As discussed, the coordinate values of vertices of the model can be quantized into n-bit unsigned integers. QuantExtent can be related to n such that larger values of n result in higher values of QuantExtent, and vice versa.

Because of the positive correlation between fLOD and QuantUnitPixels, there is a positive correlation between fLOD and ScreenPixelSize. ScreenPixelSize can correspond to the size of screen pixels in world space units at Dist, where Dist can, as is discussed in greater detail below, relate to the distance from the camera to the nearest triangle in the model. World space units can be those units used to represent items in the game world. As reflected by line 407, ScreenPixelSize is positively correlated to Dist. Accordingly, as an example, a lower value of ScreenPixelSize can drive QuantUnitPixels lower, thereby leading to a lower value of fLOD (i.e., to a higher-detail LOD). Such is keeping with a smaller value of ScreenPixelSize (e.g., due to a lower Dist value) leading to a circumstance where higher displayed model detail can more likely be appreciated by a user.

Because of the positive correlation between fLOD and QuantUnitPixels, there is a negative correlation between fLOD and ModelScale. As referenced, the ModelScale can correspond to the range of vertex position values of the model along the longest axis. Accordingly, as an example, a higher value of ModelScale can drive QuantUnitPixels lower, thereby leading to a lower value of fLOD (i.e., to a higher-detail LOD). Such is keeping with a higher value of ModelScale meaning a larger model (i.e., a higher range of vertex position values), and therefore call to display such model in greater detail to a user.

Returning to line 407, discussed ScreenPixelSize can, more specifically, be set according to the code of line 407. Here, FOV can be a field-of-view value and ScreenVerticalPixels can correspond to the vertical-direction quantity of pixels on the display of a user. Then, as noted above, Dist can relate to the distance from the camera to the nearest triangle in the model. More specifically, Dist can be set according to the code of line 409. Here, DistToModel can correspond to the distance from the camera to the origin of the nearest triangle in the model, while BoundingSphereRadius can indicate the distance from the farthest vertex position of the model to the origin. The subtraction of BoundingSphereRadius from DistToModel, as set forth by line 409, can help to ensure that the calculated fLOD value correspond to sufficient detail to render the closest triangle in the model. It is noted that, in various embodiments, Dist can be set to DistToModel (i.e., the subtraction of BoundingSphereRadius can be not performed). It is observed that such embodiments can tend to result in a higher value being calculated fLOD, corresponding to lesser detail.

Returning to edge case handling if block 403, as depicted by the code of block 403 fLOD can be set to 0—corresponding to the most detailed distinct LOD—where Dist as calculated by line 409 leads to a value of zero, or less. For example, this can be used to display the model in highest possible detail when it is very close a user. As depicted by the logic of FIG. 4, where the if condition of block 403 is not met, fLOD can be set according to lines of code 401, 405, and 407, and code blocks 411 and 413.

Regarding code blocks 411 and 413, block 411 can set fLOD to zero where the code of lines 401, 405, and 407 results in fLOD having a value of less than zero. In this way, block 411 can act to ensure that fLOD is set consistent with DistinctLOD0 being the most-detailed distinct LOD. Then—with DistinctLODs being the quantity of distinct LODs, and such distinct LODs being numbered from 0 to (DistinctLODs−1)—block 413 can set fLOD to (DistinctLODs−1) where the code of lines 401, 405, and 407 results in fLOD having a value of greater than (DistinctLODs−1). In this way, block 413 can act to ensure that fLOD is set consistent with (DistinctLODs−1) being the least-detailed distinct LOD.

In this way, the code of FIG. 4 can act towards selecting an appropriate LOD for a given model distance from the camera. For example, selecting a LOD with too much detail can waste compute power when triangles are too small to resolve on the screen, while selecting a LOD with too little detail can result in poor quality when potential detail is missing.

The operations of FIG. 4 calculate a single fLOD value. However, in various embodiments multiple fLOD values can be calculated, one for each vertex of the model. Calculation of a given per-vertex fLOD value can be performed in a manner analogous to that laid out in connection with FIG. 4, with appropriate modifications made (e.g., DistToModel can be replaced with a variable which reflects distance from the camera to the given vertex). Such a per-vertex fLOD value approach can provide a more accurate LOD for each model triangle, at the expense of increased compute time. Also, in various embodiments a quality modifier can be applied to the calculation of fLOD. As just one example fLOD as calculated according to the code of FIG. 4 can be multiplied by a variable ModQual to yield a quality-modified fLOD value. Such functionality can facilitate decreasing or increasing model visual quality when rendering to the screen. Continuing with the example, lower values of ModQual increase rendering quality (by driving the quality-modified fLOD value lower), while higher values of ModQual can decrease rendering quality (by driving the quality-modified fLOD value higher).

The discussed operations regarding generation of fLOD calculation can, for example, be performed at run-time.

Generation of Interpolated LODs (Step 1003)

As noted, where calculation of fLOD yields a non-whole-number value, an interpolated LOD can be generated. Such interpolated LOD generation will now be discussed with reference to illustrative code.

Turning now to the vertex interpolation illustrative code of FIG. 5, an illustrative example where the discussed fLOD calculations have resulted in an fLOD value of 2.5 is shown. To facilitate discussion, the illustrative code for FIG. 5 assumes that quantization to 8-bit unsigned integers has occurred. However, in various embodiments analogous code which operates with respect to different quantization (e.g., unsigned 16-bit or unsigned 32-bit quantization) can be used. Further, while the illustrative code operates upon quantized vertex coordinates, other possibilities exist. For example, in various embodiments such vertex coordinates can be converted from quantized form to un-quantized/model space coordinate form prior to interpolation, potentially resulting in higher-precision interpolated values, at the expense of increased compute time.

In various embodiments, prior to the execution of the code of FIG. 5, a check can be performed as to whether or not fLOD is a whole number. In these embodiments, the code of FIG. 5 can be skipped where fLOD is found to be a whole number. At line 501, iLOD can be set to hold the integer/whole number portion of fLOD. As such, according to the illustrative example, line 501 causes iLOD to hold a value of 2. Next, at line 503, fracLOD can be—via the subtraction of iLOD from fLOD—set to hold the fractional portion of fLOD. According to the illustrative example, line 503 causes fracLOD to hold a value of 0.5.

At line 505 and 507 two bitmasks are generated. In particular, at line 505 bitmask PrecisionMaskA can be generated by taking a binary value of all ones and shifting it left by the iLOD (e.g., by 2 according to the illustrative example). Then, at line 507, bitmask PrecisionMaskB can be generated by taking a value of all ones and shifting it left by (iLOD+1), and therefore by 3 according to the illustrative example. As such, considering fLOD as a fractional number bound by two integers, PrecisionMaskA can correspond to the distinct LOD of the lower bounding integer, and PrecisionMask B can correspond to the distinct LOD of the higher bounding integer. As such, PrecisionMaskA can correspond to the higher detail DistinctLOD while PrecisionMaskB can correspond to the lower detail DistinctLOD. It is noted that, in various embodiments, rather than generating PrecisionMaskA and PrecisionMaskB as set forth in lines 505 and 507, previously-generated bitmasks can be used. For example, according to the illustrative example, PrecisionMaskA as generated by line 505 can be equivalent to a DistinctLOD2 bitmask previously generated as discussed above (i.e., PrecisionMask 219). Accordingly, such a previously-generated bitmask can be used for PrecisionMaskA instead of generating PrecisionMaskA anew as set forth by line 505. Likewise, further according to the illustrative example, PrecisionMaskB as generated by line 507 can be equivalent to a DistinctLOD3 bitmask previously generated as discussed above (i.e., PrecisionMask 201). Accordingly, such a previously-generated bitmask can be used for PrecisionMaskB instead of generating PrecisionMaskB anew as set forth by line 507.

Next discussed is for-each loop 509, which executes the lines of its corresponding code block with respect to the X/Y/Z coordinates of each vertex of the model. At lines 511-515, PrecisionMaskA is applied to the X/Y/Z coordinates of a given vertex of the model which is currently being visited according to the for-each loop. Likewise, at lines 517-521, PrecisionMaskB is applied to the X/Y/Z coordinates of the given vertex of the model which is currently being visited according to the for-each loop. It is noted that, in various embodiments, rather than applying PrecisionMaskA and PrecisionMaskB to the X/Y/Z coordinates of each vertex of the model according to the for-each loop and via lines 511-521, the results of previous bitmask applications can be utilized. For example, according to the illustrative example, the application of PrecisionMaskA to each vertex of the model according to the for-each loop and via lines 511-515 can have already been performed via the application of PrecisionMask 219 in connection with the processing of DistinctLOD2, as discussed above. Likewise, further according to the illustrative example, the application of PrecisionMaskB to each vertex of the model according to the for-each loop and via lines 517-521 can have already been performed via the application of PrecisionMask 201 performed in connection with the processing of DistinctLOD3, as discussed above.

At lines 523-527, weighted sums are utilized to set Interp.QX, Interp.QY, and Interp.QZ, which correspond, respectively, to the X, Y, and Z coordinates of an interpolated version of the given model vertex which is currently being visited according to the for-each loop. In particular, Interp.QX can be set according to a weighted sum where VertexA.QX (set via line 511) is weighted according to (1−fracLOD), and where VertexB.QX (set via line 517) is weighted according to fracLOD. Analogous operations can be performed at lines 525 and 527 to set Interp.QY and Interp.QZ, respectively.

In this way, where fLOD is not a whole number but rather a fractional number non-equidistantly bound by two integers, the weighted summing can favor the masked coordinate values for the distinct LOD of the closer bounding integer when yielding the interpolation. As one example, where fLOD holds a value of 1.2, the weighted summing can favor the masked coordinate values for DistinctLOD1 over the masked coordinate values for DistinctLOD2 when yielding the interpolation. As another example, where fLOD holds a value of 1.8, the weighted summing can favor the masked coordinate values for DistinctLOD2 over the masked coordinate values for DistinctLOD1 when yielding the interpolation. Further, where fLOD is a fractional number equidistantly-bound by two integers the weighted summing can, when yielding the interpolation, cause equivalent contributions by: a) the masked coordinate values for the distinct LOD of the lower bounding integer; and b) the masked coordinate values for the distinct LOD of the upper bounding integer. As such, for the illustrative example where fLOD is 2.5, the weighted summing can cause equivalent contributions by the masked coordinate values for DistinctLOD2 and the masked coordinate values for DistinctLOD3.

With completion of the code of FIG. 5, a list of vertex coordinates can be held for a newly-generated interpolated LOD which corresponds to a non-whole number fLOD value. In various embodiments, the vertex coordinates yielded by the discussed code can subsequently be subjected to operations akin to those discussed in connection with FIGS. 2A-2D so as to: a) examine the triangles of the model and determine whether any have collapsed due to the code operations having caused model vertices to become equivalent in value/position in space for the at-hand new interpolated LOD; and b) determine any triangles that are to be removed from the model for the purposes of the at-hand new interpolated LOD.

The discussed operations regarding generation of interpolated LODs can, for example, be performed at run-time.

Distinct LOD and Interpolated LOD Display (Step 1003)

As referenced, where calculation of fLOD yields a whole number value, the distinct LOD which corresponds to that whole number value can be displayed (e.g., where the calculated fLOD value is 2, DistinctLOD2 can be displayed). Further, where calculation of fLOD yields a non-whole-number value, an interpolated LOD which corresponds to that non-whole number value can be generated and displayed.

Further still, in various embodiments, where fLOD as calculated holds a non-whole-number value, the corresponding generated interpolated LOD can be displayed in a transitional fashion, with a distinct LOD being subsequently displayed. As just one example, where the calculated non-whole-number fLOD is higher than the DistinctLOD number of a currently-displayed distinct LOD by a fractional value, subsequent to display of a corresponding interpolated LOD, a distinct LOD having a DistinctLOD number one higher than that of the currently-displayed distinct LOD can be displayed. As an illustration, suppose that fLOD as calculated holds 2.8 and that DistinctLOD2 is being displayed. According to this illustration, subsequent to display of an interpolated LOD corresponding to the 2.8 fLOD value, DistinctLOD3 can be displayed. As just another example, where the calculated non-whole-number fLOD is lower than the DistinctLOD number of a currently-displayed distinct LOD by a fractional value, subsequent to display of a corresponding interpolated LOD, a distinct LOD having a DistinctLOD number one lower than that of the currently-displayed distinct LOD can be displayed. As an illustration, suppose that fLOD as calculated holds 1.6 and that DistinctLOD2 is being displayed. According to this illustration, subsequent to display of an interpolated LOD corresponding to the 1.6 fLOD value, DistinctLOD1 can be displayed. Many variations are possible.

In an aspect, display of an interpolated LOD can include obtaining the coordinate values for corresponding vertices, and the corresponding triangle data which specifies interconnections between those vertices. For an interpolated LOD, such vertex coordinate information can be obtained via the operations discussed in connection with FIG. 5, while such triangle information can be obtained by accessing triangle/vertex interconnect data associated with the model, along with consideration—in a manner analogous to that discussed—of which triangles have collapsed for the at-hand interpolated LOD.

Such obtained vertex coordinate information can be in quantized form (e.g., in quantized binary form). As such, display of the interpolated LOD can include converting such vertex coordinate information from quantized form to un-quantized/model space coordinate form. Shown in FIG. 6 is illustrative code for performing such conversion. Turning to lines 601 and 603, QUANT_CENTER and QUANT_EXTENT are set. As referenced, the quantized form can correspond to quantization into n-bit unsigned integers. QUANT_EXTENT can be related to n such that larger values of n result in higher values of QUANT_EXTENT, and vice versa. In particular, at line 603 QUANT_EXTENT can be set to $(2n-2)$. The illustrative logic of FIG. 6—which utilizes an n value of 8 to facilitate discussion (i.e., the vertices have been quantized using 8-bit unsigned integers)—sets QUANT_EXTENT to 254 (i.e., $2^8-2$ yields 254). Then, returning to line 601, QUANT_CENTER can be set to $(2^n/2)$. In keeping with this, the illustrative code of FIG. 6 sets QUANT_CENTER to 128 (i.e., $2^8/2$ yields 128).

Next discussed is for-each loop 605, which executes the lines of its corresponding code block with respect to each X/Y/Z tuple of the quantized form vertex coordinate information. In lines 607-613, Interp.QX, Interp.QY, and Interp.QZ correspond, respectively, to the quantized X, Y, and Z coordinates of the particular X/Y/Z tuple which is currently being visited according to the for-each loop. Then, ModelVertex.X, ModelVertex.Y, and ModelVertex.Z correspond, respectively, to the un-quantized/model space coordinate forms of Interp.QX, Interp.QY, and Interp.QZ.

Considering line 607, QUANT_CENTER and QUANT_EXTENT are applied as shown. Also applied as shown is ModelScale. With reference to earlier discussion, ModelScale can correspond to the range of vertex position values of the model along the longest axis. Analogous operations can be performed at lines 609 and 613 to set ModelVertex.Y and ModelVertex.Z, respectively. It is noted that for the illustrative code of FIG. 6, model space is, to facilitate discussion, equivalent to world space, where world space utilizes the units used to represent items in the game world.

As such, via the code of FIG. 6 the quantized form vertex coordinate information can be converted to un-quantized/model space coordinate form. Subsequently, each of these un-quantized/model space coordinate form vertices can be converted to horizontal/vertical (WV) screen coordinates for projection and display to the screen. In general, such conversion can involve the use of a projection matrix and/or other projection machinery. Here, such conversion to HN screen coordinates will now be discussed with reference to the illustrative code of FIG. 7. To facilitate discussion, the illustrative code of FIG. 7 operates with respect to a simplified projection wherein: a) the camera is pointed along the Y axis; b) the unrotated model is positioned along the Y axis; c) projection is to a screen with 640×480 resolution; and d) a 60 degree FOV is used.

At lines 701 and 703, ScreenPixelWidth is set to 640 and ScreenPixelHeight is set to 480, consistent with the noted 640×480 screen resolution. Then at line 705 FOV is set to 60 degrees, consistent with the noted 60 degree FOV. At line 707, ScreenPixelHeight is set at line 703 and FOV as set at line 705 are applied as shown to set Projscale.

Next discussed is for-each loop 709, which executes the lines of its corresponding code block with respect to each X/Y/Z tuple of the un-quantized/model space form vertex coordinate information, generated via the code of FIG. 6. In lines 711-715, ModelVertex.X, ModelVertex.Y, and ModelVertex.Z correspond, respectively, to the un-quantized/model space coordinates of the particular X/Y/Z tuple which is currently being visited according to the for-each loop. Also in lines 711-715, DistToModel can correspond to the distance from the camera to the origin of the nearest triangle in the model. At line 711 DistToModel and ModelVertex.Y are applied as shown to set VertexDistance. Then, at line 713 ScreenPixelWidth, ProjScale, Model.Vertex.X, and VertexDistance are applied as shown to generate the H value for the particular X/Y/Z tuple which is currently being visited according to the for-each loop. Likewise, at line 715 ScreenPixelHeight, ProjScale, Model.Vertex.Z, and VertexDistance are applied as shown to generate the V value for the particular X/Y/Z tuple which is currently being visited according to the for-each loop. As such, via execution of the code of FIG. 7, the un-quantized/model space coordinate form vertices generated via execution of the code of FIG. 6 can be converted to horizontal/vertical (H/V) screen coordinates for projection to the screen, thus achieving a 3D to 2D mapping. Subsequently, operations can be performed to project corresponding vertex interconnection lines to the screen, thereby displaying the corresponding triangles. It is noted that the discussed operations regarding interpolated LOD display can, for example, be performed at run-time.

As discussed, the interpolated LOD operations can cause model vertices to become equivalent in value/position in space. As such, a given interpolated LOD can, in terms of vertex positional data, exhibit a loss of precision relative to the original model. Further, display of an interpolated LOD to the screen can involve sorting triangles along the Z/distance-from-camera axis in order to determine the relative front-back positioning of the various triangles which are to be displayed (e.g., determining whether a given triangle should be placed in front of or in back of a second triangle). Under certain circumstances, the loss of precision in terms of vertex positional data—and in particular loss of precision in terms of Z coordinate vertex positional data—can lead to difficulties when performing the sorting. Such sorting difficulties can visually manifest themselves as visual anomalies including Z-fighting (e.g., with two triangles rapidly exchanging front-back positioning relative to one another. According to various embodiments, such sorting difficulties (and resultant visual anomalies) can be avoided by utilizing full-precision Z coordinate vertex positional data when performing the sorting. Such full-precision Z coordinate vertex positional data can be obtained by accessing data associated with the full-precision/original model. Where such sorting is performed by a renderer, the full-precision Z coordinate vertex positional data can be provided to the renderer. As another example, Z-Bias approaches can be employed.

Example LOD Operations

Via the illustrative example of FIGS. 2A-3D, an ordered vertex list, an ordered triangle list, and an LOD table are built. The ordered triangle list 319, the ordered vertex list 321, and the LOD table 323 show these lists and this table subsequent to processing of all distinct LODs of that illustrative example. Then, discussed with reference to FIG. 4 is the calculation of a fLOD value. Further, discussed in connection with FIG. 5 is the generation of an interpolated LOD, for the circumstance where such calculation of fLOD yields a non-whole-number value. Such generation can yield vertex coordinate information which is in quantized form. Discussed in connection with FIG. 6 are operations which can, for instance, convert such interpolated LOD vertex coordinate information from quantized form to un-quantized/model space coordinate form. And, discussed in connection with FIG. 7 are operations which can convert such un-quantized/model space coordinate form vertices to H/V screen coordinates for projection and display to the screen.

Figure 8A:
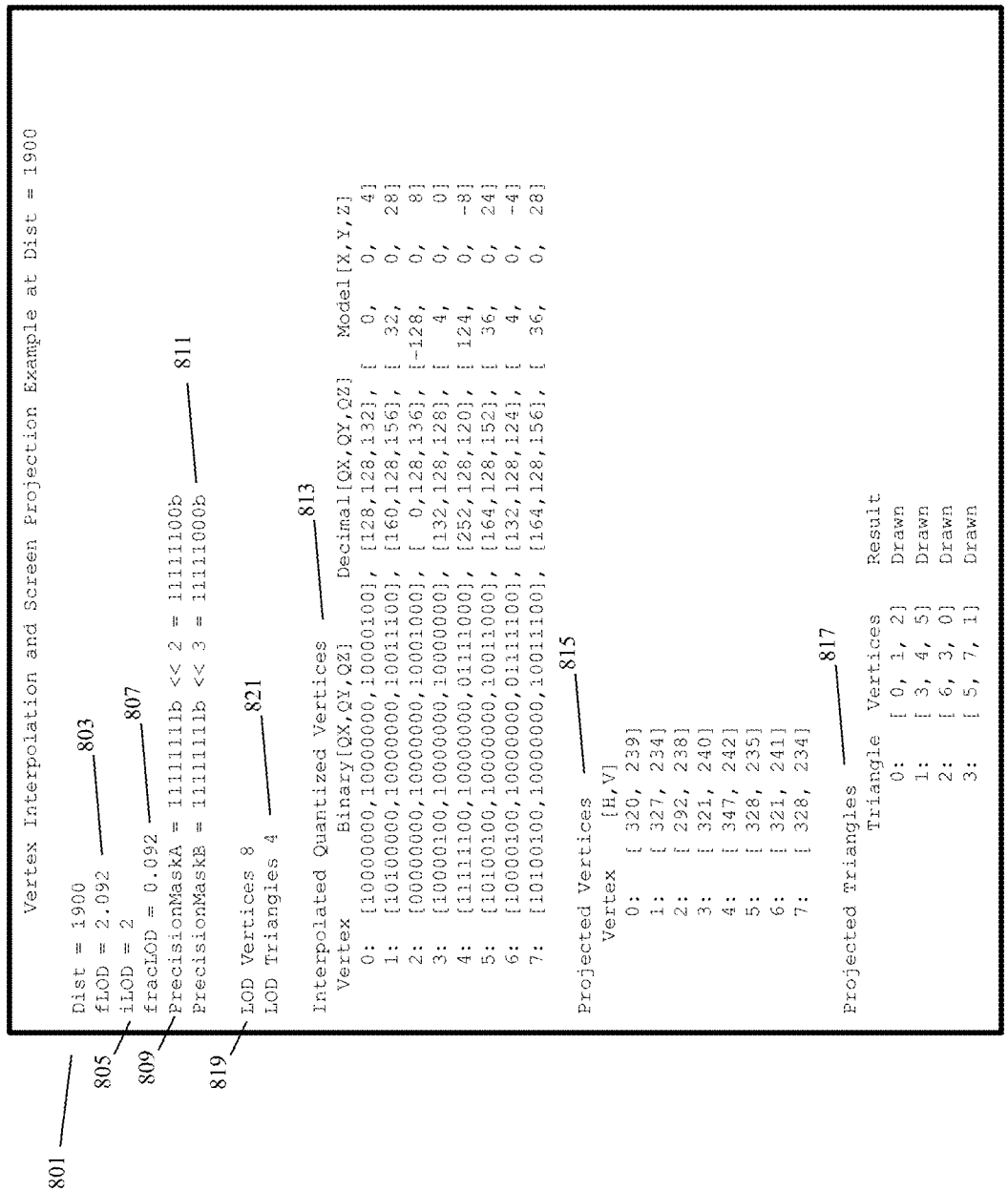
FIG. 8A is an exemplary diagram illustrating one embodiment of various data regarding example LOD operations for a first distance using the CLOD method of FIG. 1A.

Building upon this, discussed now in connection with FIGS. 8A-8C are example LOD operations which extend the illustrative example of FIGS. 2A-3D.

Turning to FIG. 8A, shown is an example where Dist, as discussed above with respect to line 409 of FIG. 4, has a value of 1900 (801). Then, performing the operations of FIG. 4 with respect to this value of Dist results in a fLOD value of 2.092 (803). Also, proceeding onward to the operations of FIG. 5 results in: a) an iLOD value of 2 (805); b) a fracLOD value of 0.092 (807); c) a PrecisionMaskA value of 11111100b (809); and d) a PrecisionMaskB value of 11111000b (811). Further still, as discussed the operations of FIG. 5 result in quantized interpolated versions of the X/Y/Z coordinates of each vertex of the model (see, for instance, lines 523-527 of for-each loop 509 of FIG. 5). The quantized interpolated coordinates for the example of FIG. 8A are shown at list 813. In particular, list 813 shows these quantized interpolated versions in quantized binary form and quantized decimal form. Also shown in list 813 are the corresponding interpolated un-quantized/model space coordinate versions.

Subsequent to the operations of FIG. 6 in which the quantized interpolated versions of the coordinates are converted to un-quantized/model space coordinate form, the operations of FIG. 7 are performed to convert these X/Y/Z coordinate values to H/V form. The result of these FIG. 7 operations is shown in list 815. Subsequently, operations of the sort discussed above can be performed to determine which triangles have collapsed. The result of such determination is shown in list 817, which shows that none of triangles 0-3 have collapsed for the example of FIG. 8A. Also shown in FIG. 8A are elements 819 and 821, reflecting that the DistinctLOD2 includes 8 vertices (i.e., vertices 0-7) and 4 triangles (i.e., triangles 0-3).

FIG. 8B shows an example similar to that of FIG. 8A, but with Dist having a value of 2100 (823). Flowing from Dist having a value of 2100, fLOD is determined to have a value of 2.247 (825), iLOD is again determined to have a value of 2 (827), and fracLOD is determined to have a value of 0.247 (829). Also, PrecisionMaskA once again has a value of 11111100b (831) and PrecisionMaskB once again has a value of 11111000b (833). Further according to the example of FIG. 8B, the quantized interpolated versions of the vertices are determined according to the operations of FIG. 5 to be as shown in list 835. Considering lines 523-527 of FIG. 5, the VertexB portions of the weighted sums—that is to say the portions which reflect the application of PrecisionMaskB—contribute more heavily than was the case for the example of FIG. 8A. Such is in keeping with the FIG. 8B fLOD value of 2.247 being closer to 3 than was the FIG. 8A fLOD value of 2.092.

Subsequently, the operations of FIG. 6 are performed to convert the coordinate values of list 835 to un-quantized/model space coordinate form. Then, these coordinate values are converted to H/V form as shown in table 837. Then, considering the data of list 837 to determine which triangles have collapsed provides results shown in table 839. Here, it can be seen that for the example of FIG. 8B triangle 3 has collapsed, due to vertex 5 and vertex 7 having become equivalent in value/position in space.

Then, FIG. 8C shows an example similar to that of FIGS. 8A and 8B, but with Dist having a value of 2400 (841). Flowing from Dist having a value of 2400, fLOD is determined to have a value of 2.451 (843), iLOD is again determined to have a value of 2 (845), and fracLOD is determined to have a value of 0.451 (847). Also, PrecisionMaskA once again has a value of 11111100b (849) and PrecisionMaskB once again has a value of 11111000b (851). Also according to the example of FIG. 8C, the quantized interpolated versions of the vertices are determined according to the operations of FIG. 5 to be as shown in list 853. Considering lines 523-527 of FIG. 5, the VertexB portions of the weighted sums contribute even more heavily than was the case for the example of FIG. 8B. Such is in keeping with the FIG. 8C fLOD value of 2.451 being even closer to 3 than was the FIG. 8B fLOD value of 2.247.

Subsequently, the operations of FIG. 6 are performed to convert the coordinate values of list 853 to un-quantized/model space coordinate form. Then, these coordinate values are converted to H/V form as shown in table 855. Further, considering the data of list 855 to determine which triangles have collapsed provides results shown in table 857. Here, it can be seen that for the example of FIG. 8C triangles 2 and 3 have both collapsed. In particular, triangle 2 has collapsed due to vertices 0 and 3 having become equivalent in value/ position in space, while triangle 3 has collapsed due to vertices 1 and 7 having become equivalent in value/position in space.

As such, the examples of FIGS. 8A-8C demonstrate that that interpolated LODs generated by way of the approaches discussed herein allow for smooth transitions between distinct LODs. Further considering the example of FIGS. 8A-8C it is observed that although small triangles in models can tend to collapse as they are drawn farther from the camera, transitionally displaying interpolated LODs generated according to the approaches discussed herein can allow for smoothing of triangle collapses as the model moves farther from the camera.

Further to the noted smooth transitions between distinct LODs, various benefits can accrue via the approaches discussed herein. For example, as discussed, the LOD operations can include: a) distinct LOD generation operations; b) fLOD calculation operations; c) interpolated LOD generation operations; and d) distinct LOD/interpolated LOD display operations. Of these, the distinct LOD generation operations can be the most processing-intensive. Then, as noted, the distinct LOD generation operations can be performed at a pre-processing stage, while the other operations can be performed at run-time. As such, by configuring LOD operations such that the most processing intensive operations are performed ahead of runtime, a run-time speed advantage can be realized.

As another example, the CLOD approaches laid out herein enjoy reduced visual artifacts, compared to other CLOD approaches. For example, according to the approaches discussed herein, it is in model space/world space—rather than in screen space—that determination is made that vertices have collapsed (i.e., become equivalent in value/position in space), and that triangles have collapsed. This can prevent the model from changing shape depending on where it is on the screen.

As another example benefit, consider those vertices and triangles that collapse at for a given not-most-detailed distinct LOD or interpolated LOD which is displayed in connection with a calculated fLOD value corresponding to a given camera distance. According to the functionality discussed herein, such vertices and triangles would anyway have collapsed at that camera distance in terms discernable screen display had the model been displayed at its most detailed LOD. As such, the same visual quality as displaying the most detailed LOD can be realized, while at the same time reaping the processing savings of displaying the not-most-detailed distinct LOD or interpolated LOD. Further, according to the functionality discussed herein, the normal vectors of a given vertex can be the same across all distinct LODs/interpolated LODs. From this, benefits including but not limited to reduced lighting anomalies at different distinct LODs/interpolated LODs can accrue. Further still, as referenced hereinabove the model geometry alteration which occur in connection with the generation of distinct LODs and interpolated LODs is, in general, limited to removing collapsed triangles with respect to less detailed ones of such LODs. From this, benefits including but not limited to eliminating the need to: a) remap texture UV coordinates; b) alter vertex normals; and c) change materials can be realized.

Vertex Alignment

In various embodiments, when lower quality LODs are displayed for a model, many of the model's vertex positions can move slightly in model space relative to their positions within the corresponding highest quality LOD. In part, this is because more vertex position LSBs are masked out for these lower quality LODs. The vertex movement generally results in a shift of less than one pixel on-screen. However, when two or more CLOD models (i.e., models implemented using the CLOD approaches discussed herein) are adjacent to each other, less than one pixel movement can cause tiny gaps that allow virtual light to pass through. This passage of virtual light can result in visual artifacts—such as background virtual lighting being visible between the two abutted CLOD models or virtual shadows being seen with gaps between the darkness.

However, not all CLOD vertex positions move when selecting lower quality LODs. As discussed above, a given one of the set of bitmasks can have all bits set to 1 except for the m least significant bits (LSBs). Those m LSBs can be set to 0. Where model vertices are quantized into n-bit unsigned integers, m can range from 0 to j, where $j \leq n$. Therefore, any X, Y, or Z vertex positions with the lower j bits initially set to zero remain stable across all LODs. Illustratively, the system can select j as 5. Here, the mask with the largest quantity of zero-valued LSBs to be employed can be 11100000b (i.e., a mask with five zero-valued LSBs). Accordingly, where the X, Y, and/or Z coordinate values of a given vertex position have only zero-valued bits within their five LSBs, this vertex position can be unaffected by any of the masks applied in those coordinate directions. As one example, where the vertex position has the X, Y, Z coordinate value [11100000b, 10000000b, 01100000b], respectively, this vertex position can be unaffected in the X, Y, and Z directions by any of the masks applied. As another example, where the vertex position has the X, Y, Z coordinate values [11111000b, 10000000b, 01111000b], this vertex position can be unaffected in the Y direction by any of the masks applied.

In various embodiments, to reduce or eliminate gaps between two abutted CLOD models, the models can be designed in such a way that the abutment point on each model aligns with these non-moving vertex positions. For example, suppose model vertices are quantized into 16-bit unsigned integers and the system has selected j as eleven. Here, if a wall of a CLOD model butts up against one or more other CLOD models along the Y-Z plane, the wall can be designed to use the non-moving X-axis positions of 0x0800 (0000100000000000b) on one edge and 0xF800 (1111100000000000b) on the other edge. These X-position values can be set by a graphic generation process (or by an artist). As an alternative, these X-position values can be set by scaling the graphic generation process's (or artist's) original dimension during a data-build process.

In the foregoing, using 0x0800 for the lower edge value instead of 0x0000 can allow some model details (e.g., a window placed on the outer surface of the wall) to extend past the abutment point.

Alternatively, a lower edge vertex position X value such as 0x07FF (0000011111111111b) can be used instead of 0x0800 as discussed previously. By using 0x07FF, vertex movement arising from mask application on that edge can expand from the center (0x8000; 1000000000000000b). This is because masking out vertex position bits for lower quality LODs moves the vertex position towards zero. Such expansion can, in some embodiments, be used to mask small gaps between models.

Explored now in greater detail will be strategies for constructing models (e.g., models that use component pieces) in a manner that reduces visual artifacts that might otherwise occur when using the CLOD approaches discussed herein. Although the following description uses exemplary models which depict buildings in a virtual world, it is to be understood that the techniques are applicable to other models as well.

As referenced, when using the CLOD approaches discussed herein, many vertices in a model can move slightly when different LODs are selected, but there are some vertex positions that remain constant for all LODs. In general, the strategies described herein rely on constructing and connecting component pieces along these constant vertex positions. In the discussion that follows, these vertex positions that are constant for all LODs will be referred to as "snap points."

When placing model components at or along snap points, in some embodiments, the graphic generation process does not consider all snap points to be available for model component placement. In these embodiments the graphic generation process can instead place model components in agreement with a minimum inter-snap point distance. This inter-snap point distance can be termed a snap point dimension. When selecting a snap point dimension, the factors of the selection include versatility and draw performance. A smaller snap point dimension can allow abutting model components to have more positional choices when drawing seams, while a larger snap point dimension can yield improved draw performance. Since CLOD LODs are not to have less resolution than the snap point dimension, smaller snap point dimensions limit the number of CLOD LODs. As just an example, in virtual large cities having a large number of CLOD LODs can allow a large quantity buildings in the distance (i.e., far from a virtual camera) to reduce to very few polygons. This can significantly improve draw performance.

The graphic generation process has great latitude in selecting the length for the snap point dimension. However, convenient snap point dimensions can include multiples of centimeters, such as 2.0 m, 1.0 m, 0.5 m and 0.25 m. As further examples, convenient snap point dimensions can include multiples of $2^n$ millimeters, such as 2048 mm, 1024 mm, 512 mm and 256 mm. Since snap point dimensions are, in various embodiments, converted to $2^n$ units, this can allow dimensions in Maya (and other 3D graphics software) to be the same as the dimensions stored in the' vertex buffer utilized in connection with the operations discussed herein.

Turning to selection of a world space resolution, it is noted that, according to the approaches discussed herein, vertex positions can be stored as quantized n-bit unsigned integers (e.g., 16-bit integers) in the CLOD vertex buffer. Accordingly, in some embodiments, the world space resolution is defined by the maximum component size supported by CLOD, with world space resolution being a 2n multiple of the snap point dimension. As one example where the snap point dimension is 1.0 m, the corresponding world space resolution can be ~2 mm (as 1.0 m/512=1.953 mm) with a maximum component size of ~128 m. As another example where the snap point dimension is 10 m, the world space resolution can be ~0.5 mm (as 1.0 m/2048=0.488 mm) with a maximum component size of ~32 m.

There are various ways to lay out the dimensions of the snap points and the world space resolution. However, for the examples of the remainder of this section the following dimensions will be used:

- 16-bit components for storing CLOD vertex X/Y/Z positions.
- 0.5 m (500 mm/19.685") snap points (e.g., for use by the graphic generation process, and/or in connection with Maya or other 3D graphics software)
- snap points scaled to 512 units in CLOD vertex X/Y/Z positions
- CLOD vertex positions where the bottom 9 bits are all zero remain constant for all LODs
- ~1 mm world space resolution. (500 mm/512=0.977 mm)
- 10 CLOD LODs
- ~64 m (~210') max dimension for component pieces The graphic generation process can use an application programming interface (API), inter-process communication, and/or another mechanism to inform the CLOD data build tools of the intended snap point dimension and world space resolution. As just some examples, the graphic generation process can so inform the CLOD data build tools on a per-model basis or once for a collection of models. Also, it is noted that where finer-grained snap points and/or additional CLOD LODs are desired, different dimensions can be used. Under such circumstances the discussed factors relating to visual artifacts can still remain, but at another scale.

In various embodiments, when model components are constructed by the graphic generation process and/or in connection with 3D graphics software (e.g., Maya), placement of vertices on snap point coordinates can be performed accurately where a vertex is intended to be used as a snap point. As just an example, a vertex position can be within ½ of the world space resolution in order for the CLOD approaches discussed herein to treat the vertex as a snap point, according to some embodiments. Using the above-listed example snap point dimension and world space resolution, a vertex can be positioned within 0.488 mm to be treated as a snap point. In certain embodiments a CLOD data process can act to force positioning errors (e.g., larger positioning errors) to a closest corresponding snap point.

The CLOD approaches discussed herein can, for example, number LODs starting at LOD0, the highest resolution LOD. LOD0 can be stored at the world space resolution that was passed to the CLOD data build tools (i.e., 0.977 mm in the above example dimensions). Each additional CLOD LOD can, as an example, be drawn at a twice coarser resolution than the preceding resolution. Illustratively, using the above example dimensions LOD5 can be drawn at 31.25 mm (~1.25") resolution.

A primary component for constructing models depicting buildings can be the wall component. Generally, the wall component cam be a rectangle aligned to snap points. Further, the wall component can optionally include overhangs, ornamentation, and/or other connected features. A wall can be modelled as a solid rectangle, or be modelled with cutouts for windows, doors, or other such features. Designing walls with cutouts can call for the cutouts to be aligned to snap point coordinates.

Figure 9:
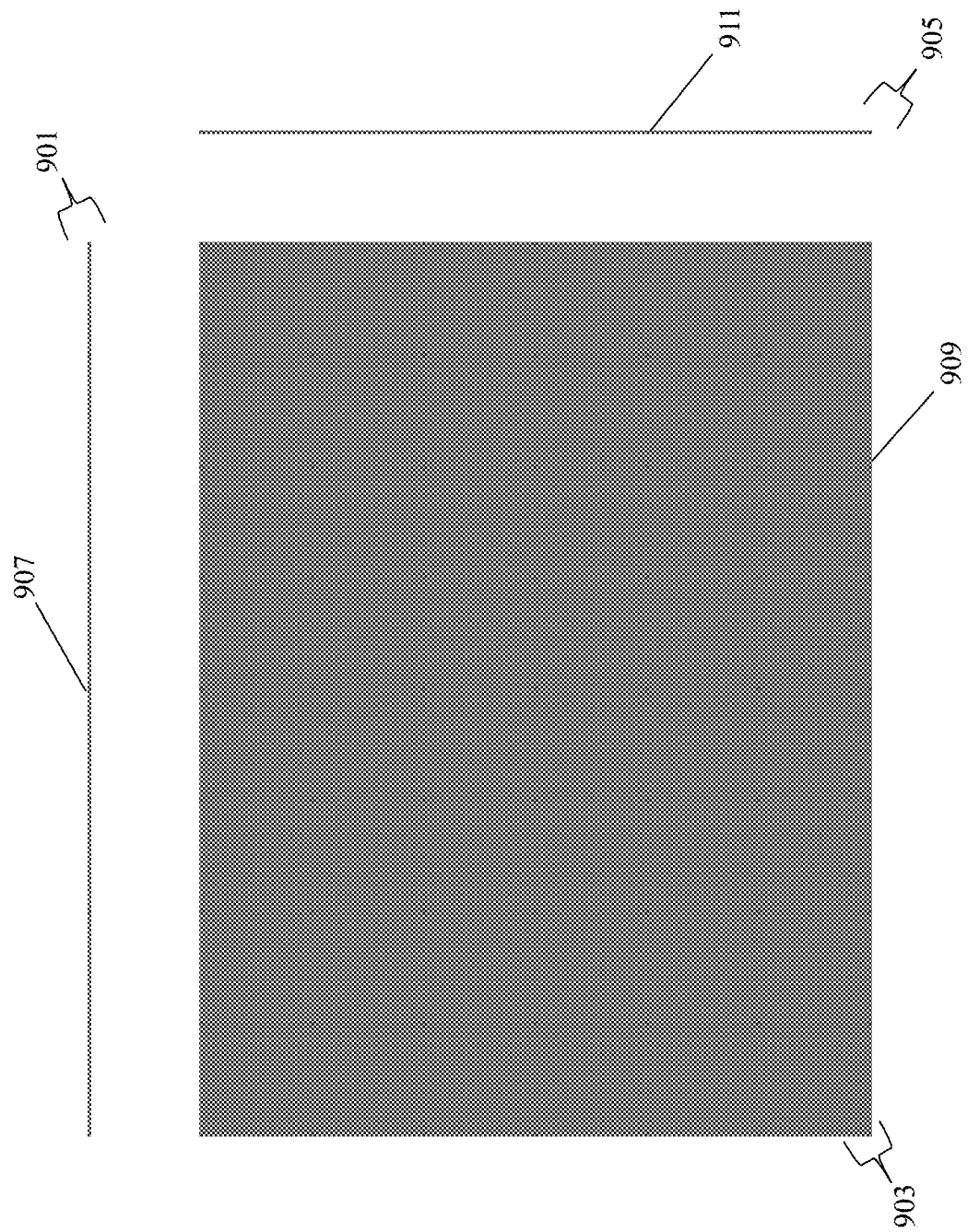
FIG. 9 is an exemplary diagram illustrating one embodiment of a model that can be used with the CLOD method of FIG. 1A.

FIG. 9 shows a solid wall that is 8 snap points wide by 6 snap points tall. Turning to FIG. 9, a top view 901, a front view 903, and a side view 905 for the wall is shown. The wall is 4 m wide by 3 m tall using the example snap point dimensions given above. The isolated pixels (e.g., pixel 903, pixel 905, and pixel 907) indicate the locations of the snap points.

Not all wall components of a building need to be the same size. As just an illustration, some wall sections can be 4 m wide, while others can be 2 m or 3 m wide. However, according to various embodiments their dimensions can be restricted to integer multiples of the snap point dimension.

In embodiments where not all wall components have the same dimensions, there is the possibility that although neighboring wall sections align along snap points, the corners of certain wall sections do not align with a neighboring wall's corner.

Figure 10:
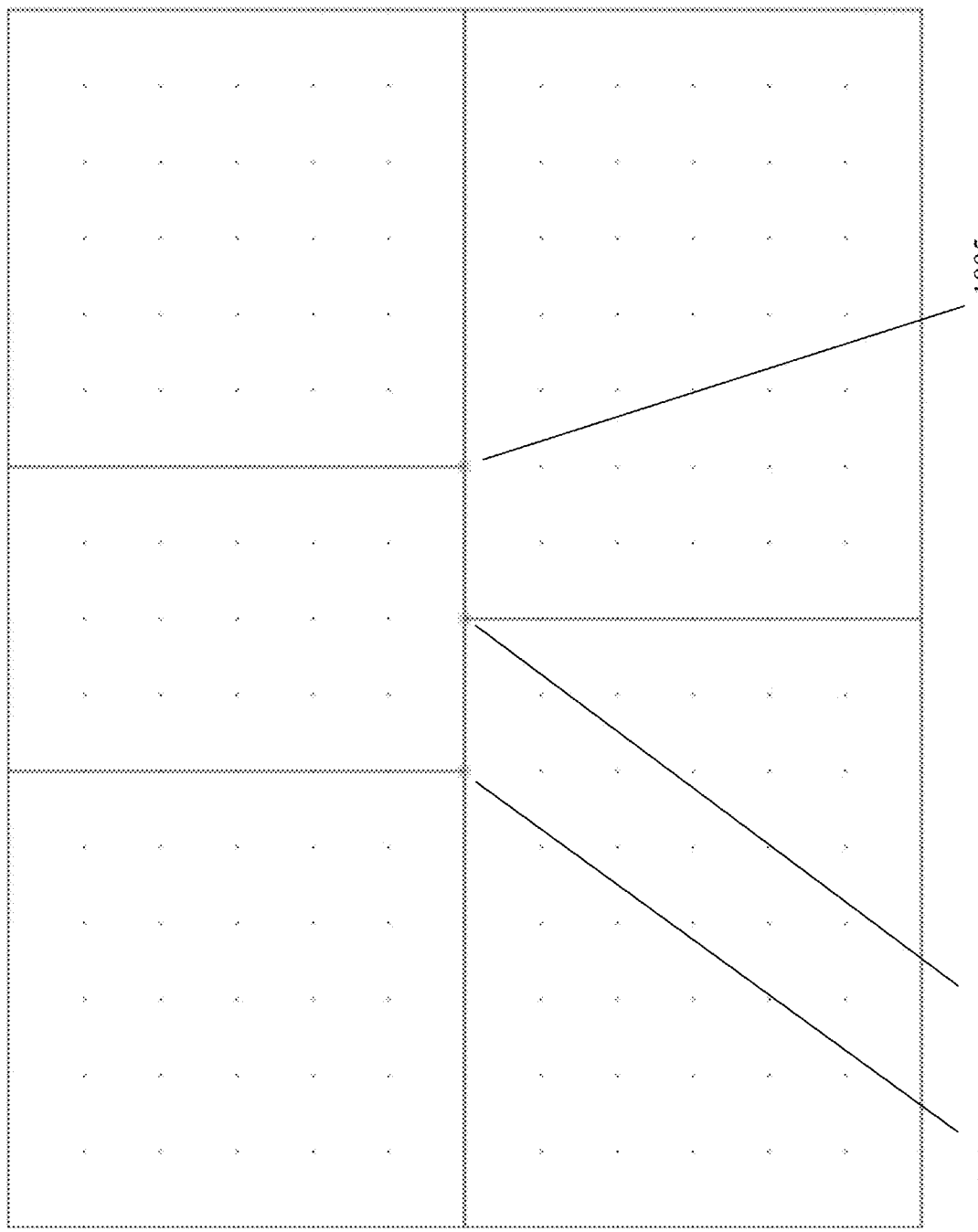
FIG. 10 is an exemplary diagram illustrating an embodiment of a wall abutment model that can be used with the CLOD method of FIG. 1A.

FIG. 10 shows an example of this phenomenon. In FIG. 10, vertices 1001, 1003, and 1005 have a potential to generate a T-Junction and therefore an open seam. As just an example, to address this potential problem the wall rectangle can be tessellated so that all snap points are triangle vertices, or just that all potential abutment corners are tessellated. As another example, where it is determined that the T-junctions do not pose a visual problem, the wall rectangle can be tessellated with two triangles. This simpler tessellation can yield benefits including reducing memory requirements and improving draw performance.

In some embodiments, the system can determine whether there is a need to address the potential problem depicted by FIG. 10. For instance, such determination can ascertain the extent to which the phenomenon depicted by FIG. 10 is captured by a virtual camera viewing the wall. It is observed that the just-discussed potential abutment problem can, under certain circumstance, also be a potential problem when not using the CLOD approaches discussed herein.

Window components—which are often used in connection with models depicting buildings—can yield CLOD-related issues which will now be discussed. Similar issues can arise in connection with other components such as doors and cornices. When the graphic generation process places windows on or against solid wall components, the windows do not necessarily need to strictly align on snap points in the wall. However, a window component can exhibit different behavior depending on how it is constructed. Since non-snap point vertices in a window model can move slightly for different CLOD LODs, the design of a window component by the graphic generation process (or by using 3D graphics software) can take this movement into account. It is unlikely for all window components of a given model to have outer dimensions that align with a practical snap point dimension. As an illustration, a smaller snap point dimension of 0.5 m can still be restrictive on the possible widths and heights for windows.

Figure 11:
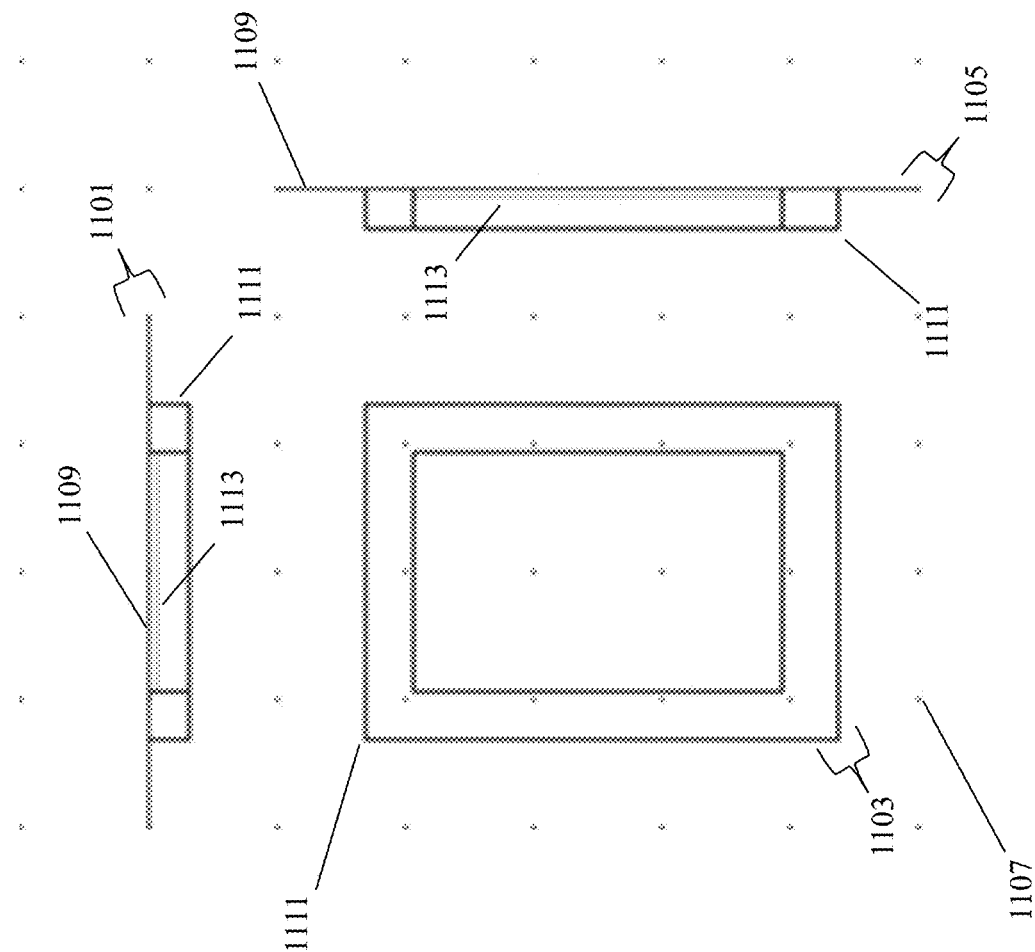
FIG. 11 is an exemplary diagram illustrating another embodiment of a model that can be used with the CLOD method of FIG. 1A.

FIG. 11 shows a top view 1101, a face view 1103, and a side view 1105 of a possible design of a window, using a wireframe view of the window. In FIG. 11, the isolated pixels (e.g., pixel 1107) show the snap points, the line pixels 1109 show the alignment to a solid wall, line pixels 1111 depict the window frame, and line pixels 1113 depict the window glass.

According to various embodiments, it can be important for the graphic generation process to achieve snap point alignment between a window and an underlying wall. This is because where the back of the window is not created on a snap point, the window can move into and out from the wall when a lower-quality LOD is selected in connection with the CLOD approaches discussed herein.

Figure 12:
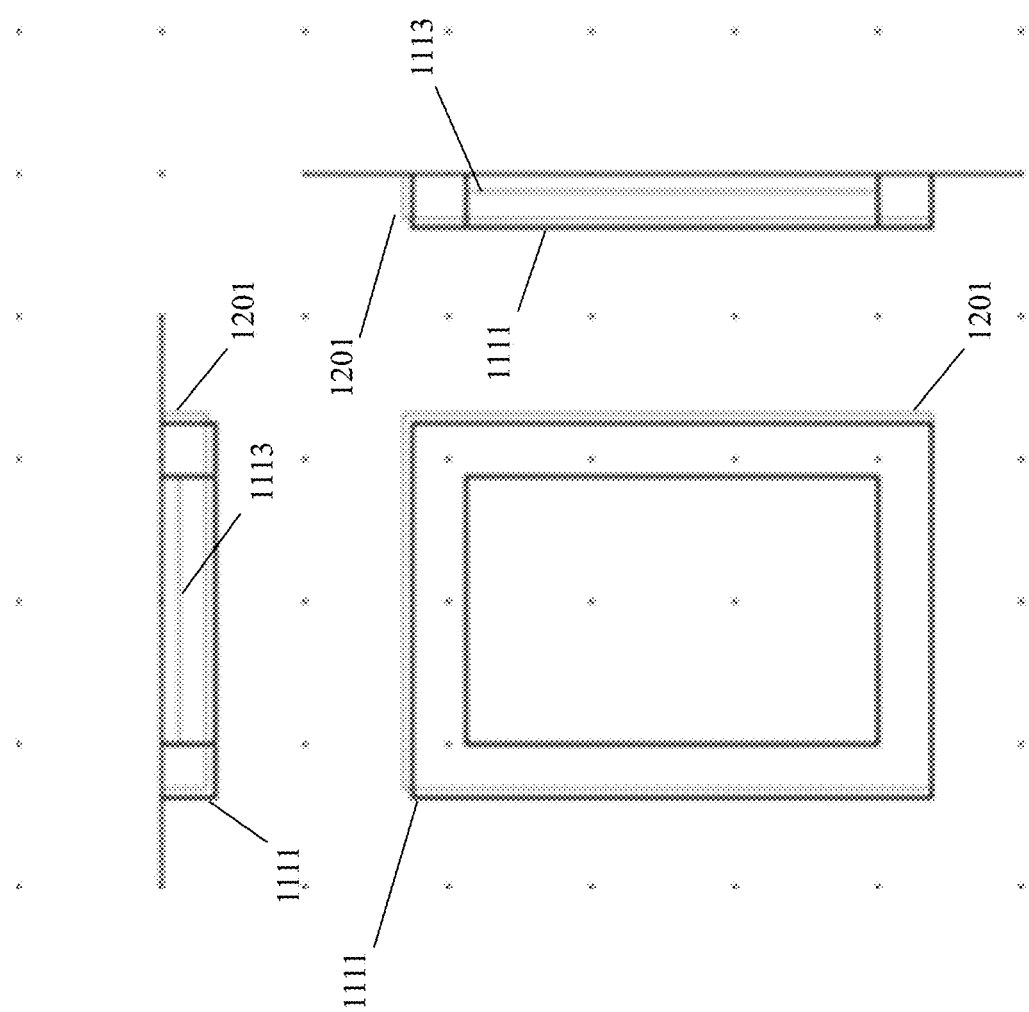
FIG. 12 is an exemplary diagram illustrating one embodiment of moving world space coordinates of the model of FIG. 11.
Figure 13:
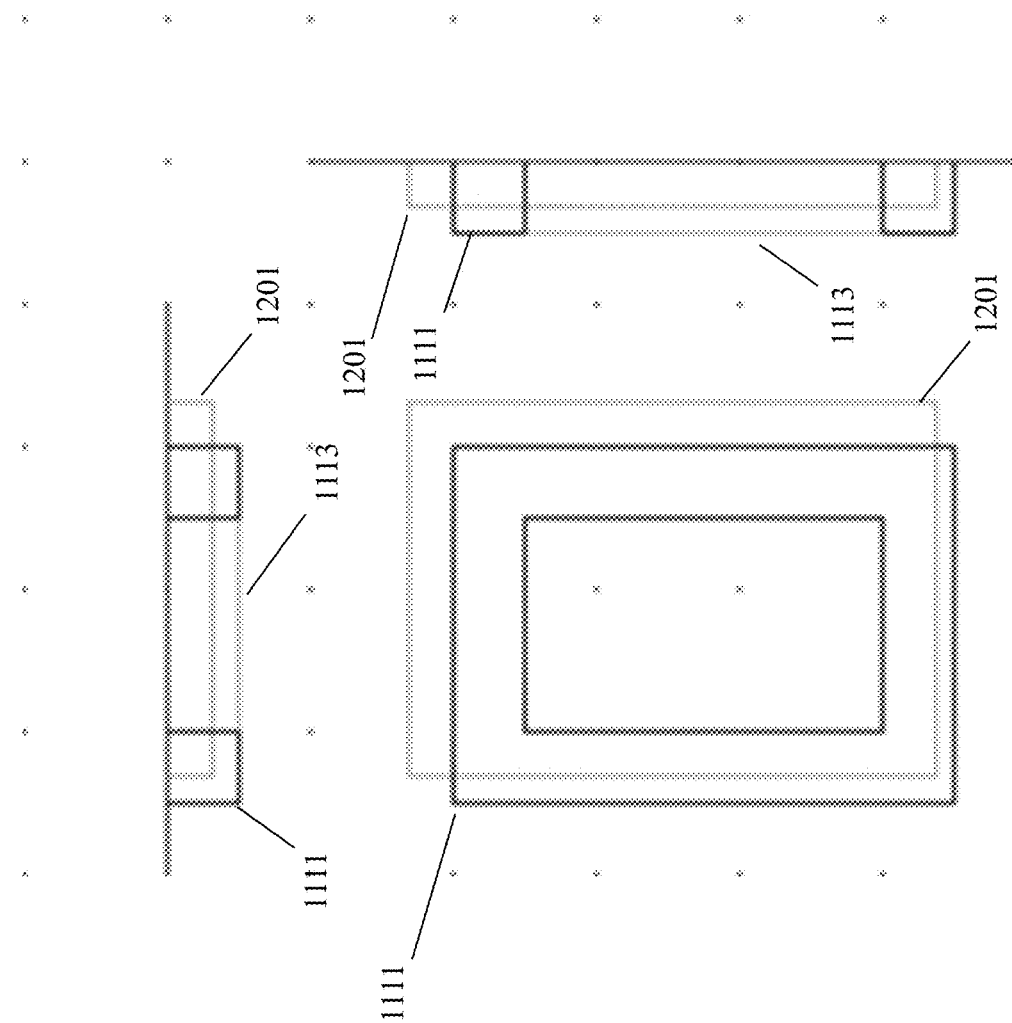
FIG. 13 is an exemplary diagram illustrating another embodiment of moving world space coordinates of the model of FIG. 11.

According to various embodiments, when drawn on screen CLOD LODs 0 through 4 can look generally like the depiction of FIG. 11. However, when LODs lower in quality than LOD 4 are drawn, the vertices of the window can move sufficiently such that non-snap point vertices are drawn at significantly different world space coordinates. FIG. 12 depicts how the non-snap point vertices of the window model move in world space for CLOD LOD 6. FIG. 13 depicts how the non-snap point vertices of the window model move in world space for CLOD LOD 8. In these figures, line pixels 1201 show the outline of the window as originally drawn by the graphic generation process and/or in connection with 3D graphics software. The movement of vertex position according to the masking discussed herein is towards lower valued coordinates. As such, the window in FIGS. 12 and 13 appears to be moving down and to the left, when looking at the front of the window.

Generally, the movement of vertices in world space is not noticeable on screen. One reason for this is that, according to various embodiments, lower quality CLOD LODs are typically only selected by the system when such movement represents less than a 1-pixel movement on screen. However, when this movement causes, as just one illustration, a sub-pixel spacing between building components, various visual artifacts can appear. As examples, a background color can show in the seam, or the sub-pixel spacing can cause a shadow anomaly. Also, if the back of window is not aligned to a snap point, a gap can appear between the wall and the back of window. This can potentially cause a visible artifact if the camera or shadow direction ran along the face of the wall. However, by having the graphic generation process follow the approaches discussed herein (e.g., having the graphic generation process design models so that the abutment points on adjacent models align with snap points), artifacts such as these can be reduced or eliminated.

Figure 14:
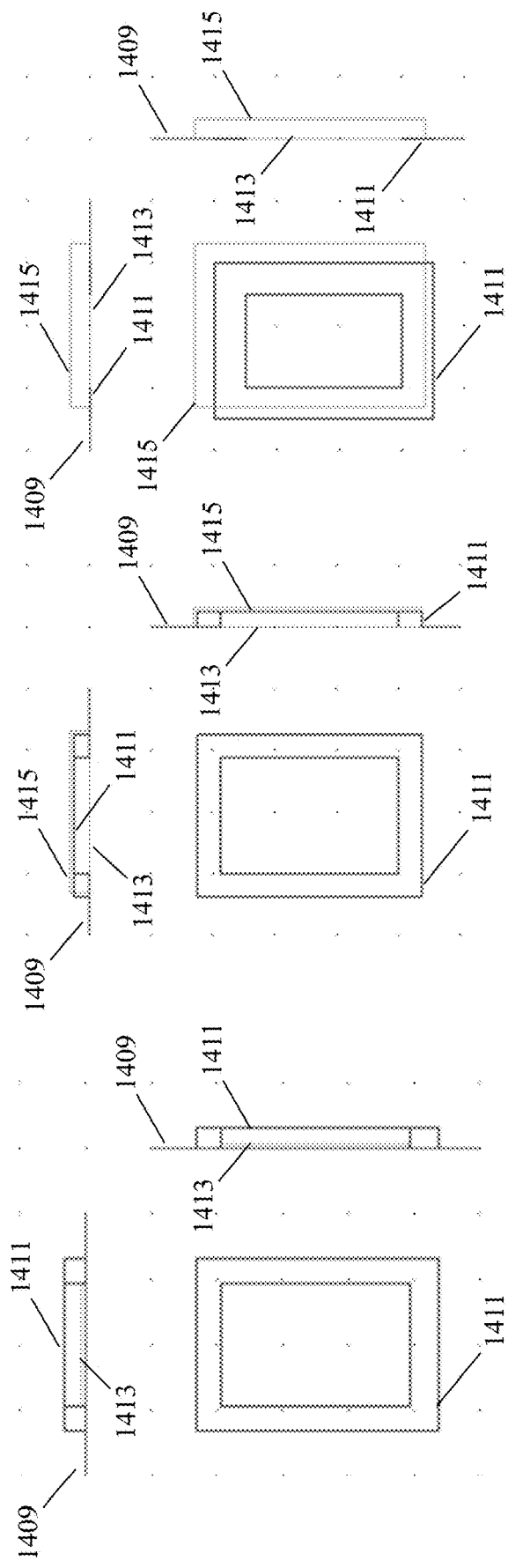
FIG. 14A is an exemplary diagram illustrating another embodiment of the model of FIG. 11.
FIG. 14B is an exemplary diagram illustrating one embodiment of moving world space coordinates of the model of FIG. 14A.
FIG. 14C is an exemplary diagram illustrating another embodiment of moving world space coordinates of the model of FIG. 14A.

The orientation selected for a model component (e.g., a building component) by the graphic generation process and/or in connection with 3D graphics software can be important when the component is used in connection with the CLOD approaches discussed herein. FIG. 14A depicts a window model similar to the window model depicted by FIG. 11, but differing insofar as having been designed with increasing coordinate positions for vertices that are farther forward of the wall. Since lower quality LODs move vertex positions to lower values, the different model orientation of FIG. 14A results in the vertices of lower quality LODs getting closer to the wall instead of farther from the wall.

FIG. 14B depicts how non-snap point vertices of the window model of FIG. 14A move in world space coordinates for CLOD LOD 6. FIG. 14C depicts now the non-snap point vertices of the window model move in world space for CLOD LOD 8. Akin to FIGS. 11-13, in FIGS. 14A-14C line pixels 1409 show alignment to a solid wall, line pixels 1411 depict the window frame, and line pixels 1413 depict the window glass. FIG. 14B shows how vertex position movement for CLOD LOD 6 has caused vertices to collapse towards the wall. In FIG. 14B, the glass 1413 has moved far enough towards the wall 1409 that it could potentially cause z-fighting with the wall. FIG. 14C shows how vertex position movement for CLOD LOD 8 has caused the entire model to collapse towards the wall 1409. Under the circumstance of CLOD LOD 8, the glass 1413 and the frame 1411 can potentially cause z-fighting with the wall 1409. However, by having the graphic generation processes appropriately select model component orientation, the noted artifacts can be reduced or avoided.

Unique Positions and CLOD Vertex Transform Cache

Hereinabove, vertices have generally been discussed in connection with their position coordinate values. However, in certain embodiments additional data can be associated with a vertex. For example, a given data element (e.g., an object or a struct) can include vertex position coordinate values, color data, texture UV data, and/or lighting normal data.

When lower quality LODs are generated by masking out the LSBs of the vertex positions, many of the resulting original vertex positions can come to share the same vertex position at the lower quality LODs. In this way, for a lower quality LOD there can be multiple vertices (e.g., vertex data elements) that hold the same vertex position values due to the masking, but differ in terms of color, texture UV, and/or lighting normal data.

In certain embodiments, such masking-resultant common vertex position values can be leveraged to realize processing, storage, and other savings.

In particular, when transforming vertex positions (e.g., transforming to world space and/or to clip space), all of the vertices for lower quality LODs that share the same vertex position values can use the same vertex transformation. As just an example, in order to facilitate this all of the triangles that use a vertex with a common position can reference a single vertex as a stand-in for the other vertices with the same position. This single vertex can, for instance, be referred to as a "unique position." The remaining vertices with the same position do not need to be transformed. Triangles that use unique position vertices can store a reference to the original vertex and a reference to a unique position vertex.

Models that are not subject to CLOD processing can also have multiple vertices (e.g., vertex data elements) that hold the same vertex position values, but hold different other data (e.g., lighting normal or texture UV data). However, this vertex position redundancy can be multiplied when LSB vertex position bit-masking of the sort discussed is performed. As such, the discussed functionality of utilizing the same vertex transformation for lower quality LODs that share the same vertex position values can be particularly beneficial.

To further optimize the performance gain of unique positions, in certain embodiments a vertex transform cache can be used to transform the vertex positions as few times as possible. In particular, the vertex position buffer can be reordered to place the unique position vertices in each LOD together. Further, a list of transform commands can be generated that inform a transform process.

These commands can inform the transform process to transform multiple groups of unique position vertices, place those transformed vertices into a cache, and then process a number of triangles that are guaranteed to only reference transformed vertices present in the cache. Each subsequent transform command can transform further groups of vertices, and can replace other groups of vertices in the cache. Some of the transformed groups can remain in the cache while further triangles are processed.

Because, in various embodiments, the unique position vertices are grouped together in each LOD, not all of the unique position vertices for the higher quality LODs are together. Instead, they are spread out among the lower quality LODs. As such, the structure of the CLOD vertex transform cache can reduce the number of vertex transforms that are performed for the higher quality LODs.

Hardware and Software

According to various embodiments, various functionality discussed herein can be performed by and/or with the help of one or more computers. Such a computer can be and/or incorporate, as just some examples, a personal computer, a server, a smartphone, a system-on-a-chip, and/or a microcontroller. Such a computer can, in various embodiments, run Linux, MacOS, Windows, or another operating system.

Figure 15:
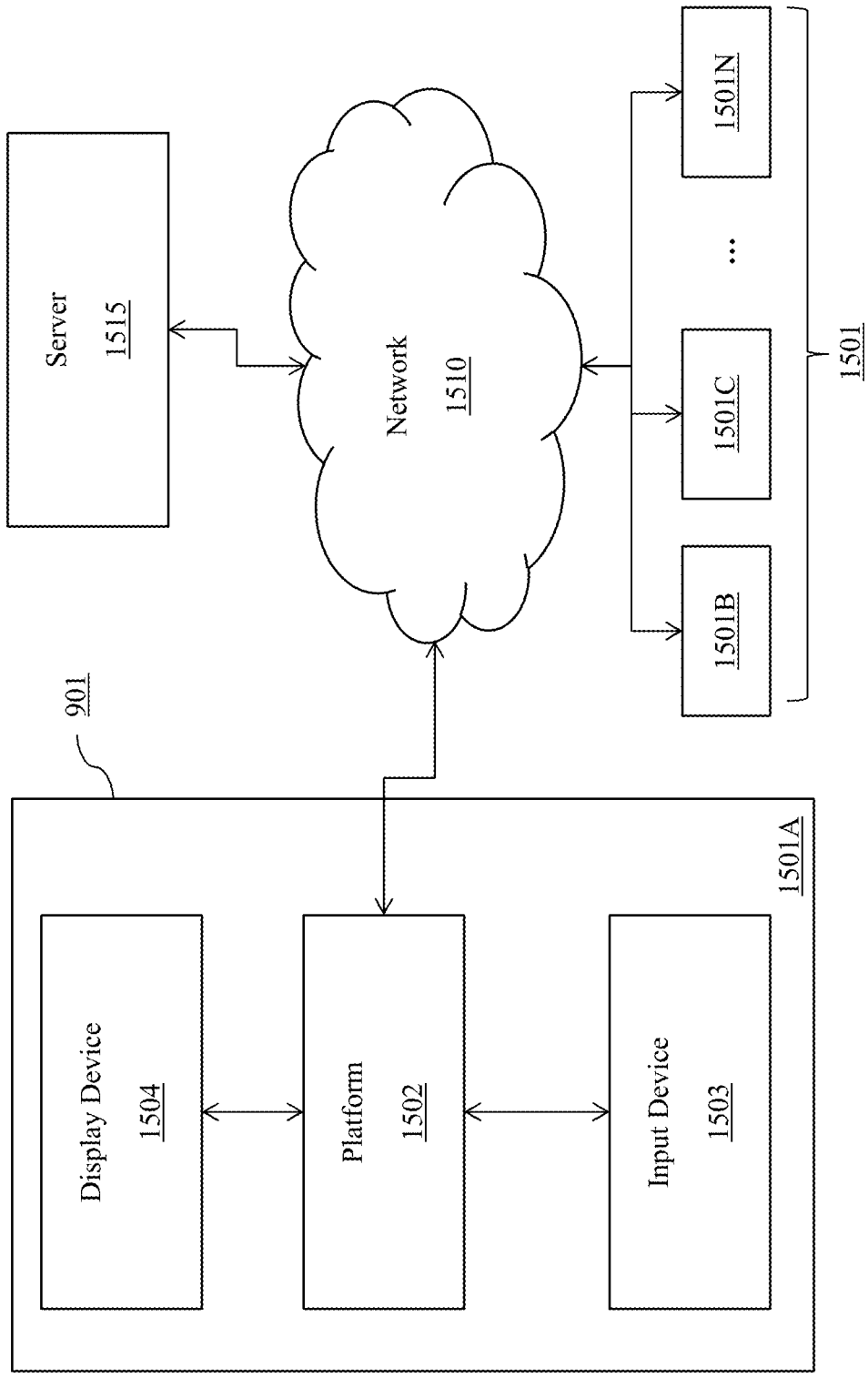
FIG. 15 is an exemplary top-level block diagram illustrating one embodiment of a network multiplayer gaming environment including at least one peer device for implementing the CLOD method of FIG. 1A.

Such a computer can also be and/or incorporate one or more processors operatively connected to one or more memory or storage units, wherein the memory or storage may contain data, algorithms, and/or program code, and the processor or processors may execute the program code and/or manipulate the program code, data, and/or algorithms. Turning to FIG. 15, the CLOD system 100 can be implemented between a network 1510 (e.g., cloud) comprising a server 1515 (e.g., a single server machine, multiple server machines, and/or a content delivery network) communicating with a plurality of player consoles 1501 (shown as any number of player consoles 1501A-1501N). A player console 1501 can be any system with a processor, memory, capability to connect to the network, and capability of executing gaming software in accordance with the disclosed embodiments. A hardware and network implementation suitable for the disclosed system is described in greater detail in commonly assigned U.S. Pat. No. 9,901,831, entitled "System and Method for Network Gaming Architecture," incorporated herein by reference.

The player console 1501A is shown in further detail for illustration purposes only. As shown, the player console 1501 can include any number of platforms 1502 in communication with an input device 1503. For example, the platform 1502 can represent any biometrics, motion picture, video game, medical application, or multimedia platform as desired. According to one embodiment disclosed herein, the platform 1502 is a gaming platform for running game software and various components in signal communication with the gaming platform 1502, such as a dedicated game console including an XBOX One® (or XBOX Series X or S) manufactured by Microsoft Corp., PLAYSTATION 4 (or 5)® manufactured by Sony Corporation, and/or WII U® (or Switch®) manufactured by Nintendo Corp. In other embodiments, the platform 1502 can also be a personal computer, laptop, tablet computer, or a handheld mobile device. One or more players can use a gaming platform to participate in a game. Multiple gaming platforms may be linked together locally (e.g., via a LAN connection), or via the network 1510 (e.g., the Internet or other communication networks).

The network 1510 can also include any number of wired data networks and/or any conventional wireless communication network, for example, radio, Wireless Fidelity (Wi-Fi), cellular, satellite, and broadcasting networks. Exemplary suitable wireless communication technologies used with the network 1510 include, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT) and others.

The platform 1502 typically is electrically coupled to a display device 1504. For example, the display device 1504 can be an output device for presentation of information from the platform 1502 and includes a television, a computer monitor, a head-mounted display, a broadcast reference monitor, a medical monitor, the screen on a tablet or mobile device, and so on. In some embodiments, the platform 1502 and/or the display device 1504 is in communication with an audio system (not shown) for presenting audible information.

In FIG. 15, the platform 1502 also is electrically or wirelessly coupled to one or more controllers or input devices, such as an input device 1503. In some embodiments, the input device 1503 is a game controller and includes keyboards, mice, gamepads, joysticks, directional pads, analog sticks, touch screens, and special purpose devices (e.g., steering wheels for driving games and/or light guns for shooting games). Additionally and/or alternatively, the input device 1503 includes an interactive-motion-tracking system, such the Microsoft Xbox One KINECT® device or the Sony PlayStation® 4 (or 5) Camera, for tracking the movements of a player within a 3-dimensional physical space. The input device 1503 provides data signals to the platform 1502, which processes the data and translates the player's movements on the display device 1504. The platform 1502 can also perform various calculations or operations on inputs received by the sensor and instruct the display to provide a visual representation of the inputs received as well as effects resulting from subsequent operations and calculations.

In one embodiment, the platform 1502 can be connected via the network 1510 to the server 1515 that can host, for example, multiplayer games and multimedia information (e.g., scores, rankings, tournaments, and so on). Users can access the server 1515 when the platform 1502 is online via the network 1510. Reference herein to the platform 1502 can include gaming platforms executing video game software or game software (e.g., computer program products, tangibly embodied in a computer-readable storage medium). Additionally and/or alternatively, references to the platform 1502 can also include hardware only, or a combination of hardware and/or software. In some embodiments, the platform 1502 includes hardware and/or software, such as a central processing unit, one or more audio processors, one or more graphics processors, and one or more storage devices.

In some embodiments, a selected player console 1501A-N can execute a video game that includes animation of one or more virtual players in a virtual world and at least one non-player object (NPC). NPCs can include, for example, cars, boats, aircrafts, and other vehicles in the virtual world. The virtual world can include game spaces with these NPCs and player characters that are animated using the systems and methods described herein.

RAMIFICATIONS AND SCOPE

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

Although the description above contains many specifics, these are merely provided to illustrate the invention and should not be construed as limitations of the invention's scope. Thus, it will be apparent to those skilled in the art that various modifications and variations can be made in the system and processes of the present invention without departing from the spirit or scope of the invention.

In addition, the embodiments, features, methods, systems, and details of the invention that are described above in the application may be combined separately or in any combination to create or describe new embodiments of the invention.

We claim:

1. A computer-implemented method for rendering continuous levels of detail for computer graphic models, comprising:
generating, by a computing system, a plurality distinct levels of detail for a computer graphic model, said generating each of the plurality distinct levels of detail comprising:
applying, by the computing system, a mask to vertex values of the computer graphic model, wherein the mask application alters precision of the vertex values,
determining, by the computing system, whether the mask application has caused vertices of the computer graphic model to become equivalent, and
determining, by the computing system, whether the mask application has caused triangle collapse;
calculating, by the computing system, one or more floating point level of detail values for the computer graphic model, wherein the floating point level of detail values regard viewing of the computer graphic model; and
displaying, by the computing system, the computer graphic model, wherein said display presents one of the plurality distinct levels of detail, or an interpolated level of detail.

2. The computer-implemented method of claim 1, further comprising:
removing, by the computing system, at least one collapsed triangle with respect to at least one of the plurality distinct levels of detail.

3. The computer-implemented method of claim 1, further comprising:
quantizing, by the computing system, vertex values of the computer graphic model into markable forms.

4. The computer-implemented method of claim 1, further comprising:
populating, by the computing system, with generation of each of the plurality distinct levels of detail, one or more of an ordered triangle list or an ordered vertex list.

5. The computer-implemented method of claim 1, wherein the calculation of the floating point level of detail values utilizes one or more of a distance to a virtual camera, a field of view, a screen resolution, a model scale, or a vertex quantization extent.

6. The computer-implemented method of claim 1, further comprising:
generating, by the computing system, the interpolated level of detail, wherein the generation comprises performing at least one of the mask application or a weighted sum operation.

7. The computer-implemented method of claim 1, wherein the display of the computer graphic model comprises the computing system performing at least one of vertex dequantization or conversion to screen coordinates.

8. The computer-implemented method of claim 1, further comprising:
determining, by the computing system, one or more vertices of the computer graphic model to have common position values due to the mask application; and
utilizing, by the computing system, at least one common vertex transformation for the one or more vertices.

9. The computer-implemented method of claim 8, wherein a vertex transformation cache is used.

10. The computer-implemented method of claim 1, further comprising:

selecting, by the computing system, for the computer graphic model, one or more vertices having positions unaffected by the mask application by the computing system.

11. A non-transitory nonvolatile computer program product comprising a processor-readable medium having a sequence of instructions stored thereon, which, when executed by the processor, causes the processor to execute rendering of continuous levels of detail for computer graphic models, the sequence of instructions comprising:
instructions for generating a plurality distinct levels of detail for a computer graphic model, said instructions for generating each of the plurality distinct levels of detail comprising:
instructions for applying a mask to vertex values of the computer graphic model, wherein the mask application alters precision of the vertex values,
instructions for determining, by the computing system, whether the mask application has caused vertices of the computer graphic model to become equivalent, and
instructions for determining, by the computing system, whether the mask application has caused triangle collapse;
instructions for calculating one or more floating point level of detail values for the computer graphic model, wherein the floating point level of detail values regard viewing of the computer graphic model; and
instructions for displaying the computer graphic model, wherein said display presents one of the plurality distinct levels of detail, or an interpolated level of detail.

12. The non-transitory nonvolatile computer program product of claim 11, the sequence of instructions further comprising:
instructions for removing at least one collapsed triangle with respect to at least one the plurality distinct level of detail.

13. The non-transitory nonvolatile computer program product of claim 11, the sequence of instructions further comprising:
instructions for quantizing vertex values of the computer graphic model into markable forms.

14. The non-transitory nonvolatile computer program product of claim 11, the sequence of instructions further comprising:
instructions for populating, with generation of each of the plurality distinct levels of detail, one or more of an ordered triangle list or an ordered vertex list.

15. The non-transitory nonvolatile computer program product of claim 11, wherein the calculation of the floating point level of detail values utilizes one or more of a distance to a virtual camera, a field of view, a screen resolution, a model scale, or a vertex quantization extent.

16. The non-transitory nonvolatile computer program product of claim 11, the sequence of instructions further comprising:
instructions for generating the interpolated level of detail, wherein the generation comprises performing at least one of the mask application or a weighted sum operation.

17. The non-transitory nonvolatile computer program product of claim 11, wherein the display of the computer graphic model comprises performing at least one of vertex dequantization or conversion to screen coordinates.

18. The non-transitory nonvolatile computer program product of claim 11, the sequence of instructions further comprising:
instructions for determining one or more vertices of the computer graphic model to have common position values due to the mask application; and
instructions for utilizing at least one common vertex transformation for the one or more vertices.

19. The non-transitory nonvolatile computer program product of claim 18, wherein a vertex transformation cache is used.

20. The non-transitory nonvolatile computer program product of claim 11, the sequence of instructions further comprising:
instructions for selecting, for the computer graphic model, one or more vertices having positions unaffected by the mask application by the computing system.

21. A system for rendering of continuous levels of detail for computer graphic models, the system comprising:
at least one processor; and
a memory storing instructions that, when executed by the at least one processor, cause the system to perform:
generating a plurality distinct levels of detail for a computer graphic model, said generating each of the plurality distinct levels of detail comprising:
applying, by the computing system, a mask to vertex values of the computer graphic model, wherein the mask application alters precision of the vertex values,
determining, by the computing system, whether the mask application has caused vertices of the computer graphic model to become equivalent, and
determining, by the computing system, whether the mask application has caused triangle collapse;
calculating one or more floating point level of detail values for the computer graphic model, wherein the floating point level of detail values regard viewing of the computer graphic model; and
displaying the computer graphic model, wherein said display presents one of the plurality distinct levels of detail, or an interpolated level of detail.

22. The system of claim 21, wherein the instructions, when executed by the at least one processor, further cause the system to perform:
removing at least one collapsed triangle with respect to at least one of the plurality distinct levels of detail.

23. The system of claim 21, wherein the instructions, when executed by the at least one processor, further cause the system to perform:
quantizing vertex values of the computer graphic model into markable forms.

24. The system of claim 21, wherein the instructions, when executed by the at least one processor, further cause the system to perform:
populating, with generation of each of the distinct levels of detail, one or more of an ordered triangle list or an ordered vertex list.

25. The system of claim 21, wherein the calculation of the floating point level of detail values utilizes one or more of a distance to a virtual camera, a field of view, a screen resolution, a model scale, or a vertex quantization extent.

26. The system of claim 21, wherein the instructions, when executed by the at least one processor, further cause the system to perform:
generating the interpolated level of detail, wherein the generation comprises performing at least one of the mask application or a weighted sum operation.

27. The system of claim 21, wherein the display of the computer graphic model comprises performing at least one of vertex dequantization or conversion to screen coordinates.

28. The system of claim 21, wherein the instructions, when executed by the at least one processor, further cause the system to perform:

determining one or more vertices of the computer graphic model to have common position values due to the mask application; and utilizing at least one common vertex transformation for the one or more vertices.

29. The system of claim 28, wherein a vertex transformation cache is used.

30. The system of claim 21, wherein the instructions, when executed by the at least one processor, further cause the system to perform:

selecting, for the computer graphic model, one or more vertices having positions unaffected by the mask application by the computing system.

\* \* \* \* \*